(12) United States Patent
Jäntti et al.

(10) Patent No.: US 9,768,690 B2
(45) Date of Patent: Sep. 19, 2017

(54) SWITCHED MODE POWER SUPPLY OUTPUT STAGE CONFIGURATION

(71) Applicant: Telefonaktiebolaget L M Ericsson (publ), Stockholm (SE)

(72) Inventors: Joni Jäntti, Oulu (FI); Tarmo Ruotsalainen, Oulu (FI)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 253 days.

(21) Appl. No.: 14/573,276

(22) Filed: Dec. 17, 2014

(65) Prior Publication Data

US 2016/0181917 A1    Jun. 23, 2016

(51) Int. Cl.
G06F 1/00 (2006.01)
H02M 3/158 (2006.01)
H02M 3/28 (2006.01)
H02M 1/00 (2006.01)

(52) U.S. Cl.
CPC ........... *H02M 3/158* (2013.01); *H02M 3/285* (2013.01); *H02M 2001/0012* (2013.01)

(58) Field of Classification Search
CPC ................................ G06F 1/32; H02M 3/158
See application file for complete search history.

(56) References Cited

U.S. PATENT DOCUMENTS

| 6,430,074 B1 * | 8/2002 | Srinivasan | G11C 15/00 365/203 |
| 7,532,868 B1 * | 5/2009 | Sapozhnykov | H04W 52/24 375/346 |
| 7,583,519 B2 | 9/2009 | Piper et al. | |
| 8,471,405 B2 | 6/2013 | DiMarco et al. | |
| 8,547,164 B2 | 10/2013 | Flores et al. | |
| 9,119,162 B2 | 8/2015 | Stenzel et al. | |

(Continued)

OTHER PUBLICATIONS

Trescases, Olivier et al., "A Digitally Controlled DC-DC Converter Module with a Segmented Output Stage for Optimized Efficiency", Proceedings of the 18th International Symposium on Power Semiconductor Devices & IC's, Jun. 4-8, 2006, pp. 1-4, Naples, Italy.

*Primary Examiner* — Mohammed Rehman
(74) *Attorney, Agent, or Firm* — Coats & Bennett, PLLC

(57) ABSTRACT

A method of optimizing the number of output stages of a switched mode power supply features a dynamically-updated lookup table (LUT) storing historic output stage configuration data per system operating performance point (OPP). Upon entering an OPP, a margin is added to the historic optimal configuration. During operation at the OPP, the current drawn by the load is periodically monitored, and the number of output stages is dynamically adjusted, as needed (with low pass filtering to ensure stability). When the system exits the OPP, a running average of the optimal number of output stages for the OPP is updated with the actual number of output stages enabled in this iteration of the OPP. A running average of the deviation, or change in number of output stages enabled, is also maintained. The updated values are written to the LUT, for use in setting the initial output stage configuration the next time the same OPP is invoked. This methodology is adaptive and self-learning, and automatically accounts for variations such as temperature, aging, process variation, software changes, and the like.

16 Claims, 17 Drawing Sheets

(56) References Cited

U.S. PATENT DOCUMENTS

| | | |
|---|---|---|
| 2004/0145360 A1 | 7/2004 | Pearce et al. |
| 2006/0119992 A1 | 6/2006 | Pearce |
| 2007/0236197 A1 | 10/2007 | Vo |
| 2009/0094473 A1* | 4/2009 | Mizutani ............... G06F 1/3203 713/340 |
| 2009/0224869 A1* | 9/2009 | Baker .................... G07C 5/008 340/5.1 |
| 2010/0241306 A1* | 9/2010 | Akisada ............. B60H 1/00735 701/33.4 |
| 2011/0051479 A1 | 3/2011 | Breen et al. |
| 2012/0271472 A1* | 10/2012 | Brunner ................ G06F 1/3209 700/295 |
| 2013/0159734 A1 | 6/2013 | Pan |
| 2013/0311792 A1 | 11/2013 | Ponnathota et al. |

* cited by examiner

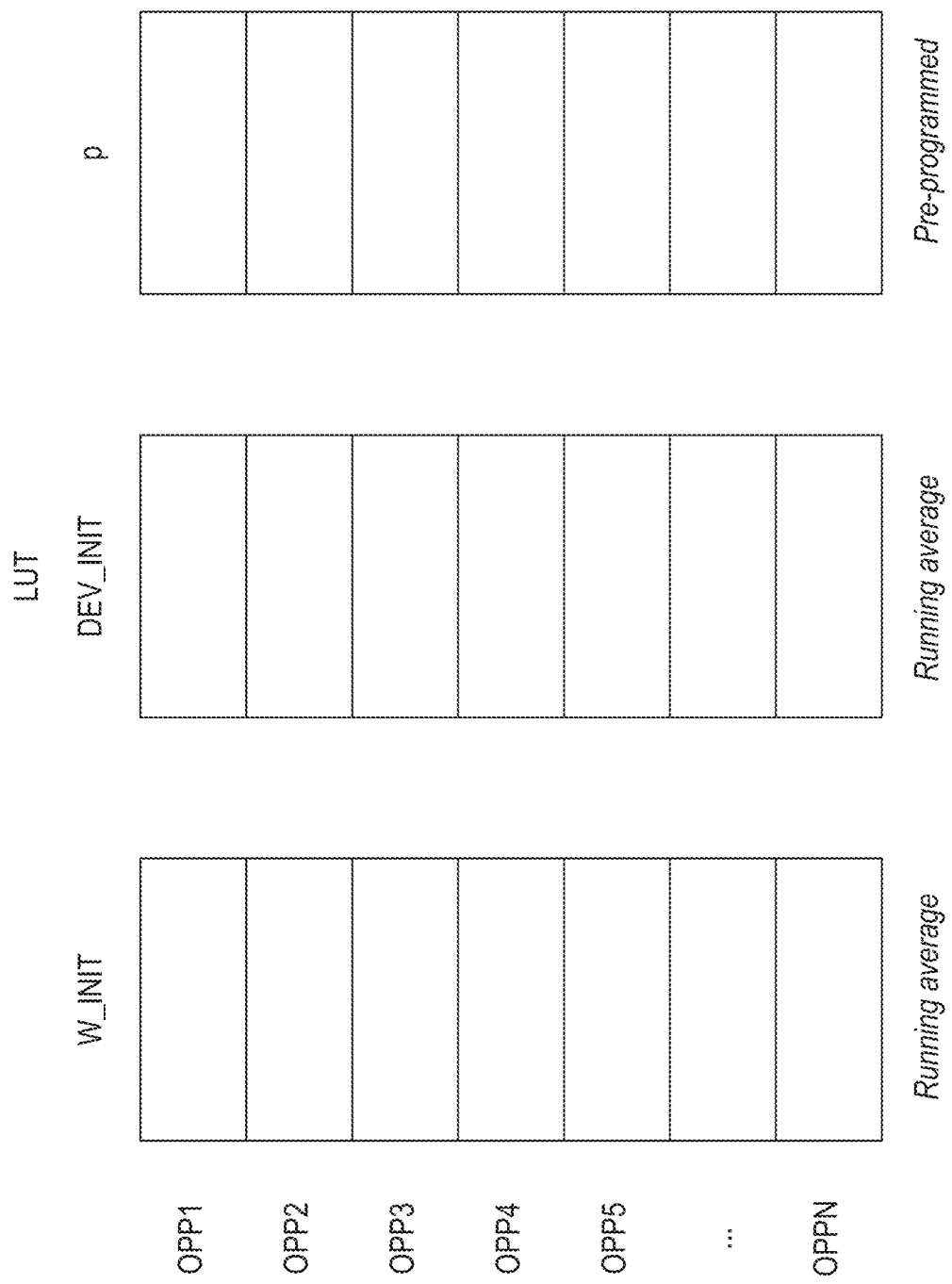

SWITCHED MODE POWER SUPPLY OUTPUT STAGE CONFIGURATION

FIELD OF INVENTION

The present invention relates generally to switched mode power supplies, and in particular to a method of optimizing SMPS output stage configuration.

BACKGROUND

Portable electronic devices are ubiquitous accoutrements in modern life. Cellular telephones, smartphones, satellite navigation receivers, e-book readers and tablet computers, wearable computers (e.g., glasses, wrist computing), cameras, and music players are just a few examples of the many types of portable electronic devices in widespread use. Portable electronic devices are powered by batteries—either replaceable batteries such as alkaline cells, or rechargeable batteries such as NiCd, NiMH, LiOn, or the like. In either case, the useful life of portable electronic devices is limited by available battery power, which decreases in proportion to the length of use of the device, and the level of power consumption during that use.

Trends in portable electronic device design include higher levels of circuit integration, shrinking device form factors (and hence smaller batteries), increasing functionality requiring more memory and more powerful processors, and wireless connectivity—all of which have made power management a critical area of optimization for portable electronic device designers.

One approach to power management is the definition of a plurality of Operating Performance Points (OPP) for at least some integrated circuits (IC). An OPP may define the minimum supply voltages to be applied to various parts of the chip (e.g. logic or memory arrays), the current requirements, operating frequencies, and the like. In general, an OPP defines the minimum power requirements for stable operation of the IC for some operating state or use case. The system transitions between predefined OPPs in response to, e.g. user activity or incoming communications, switching to lower-power OPPs whenever possible to reduce overall power consumption.

Power management circuits are an increasingly sophisticated part of modern portable electronic device system design. Power management circuits may optimize power consumption by the use of switched mode power supplies (SMPS). As known in the art, a SMPS delivers power from a source, such as a battery, to a load, such as one or more ICs, by switching discrete quanta of charge through switching transistors into or out of an energy storage component such as an inductor or capacitor. Various parameters of the SMPS may be configured to provide optimum supply voltages for each OPP. An optimum supply voltage is one that is sufficient for stable operation of the IC, but which minimizes current consumption. The parameters that may be adjusted include SMPS switching frequency, switching mode (e.g., PWM, PSK, PFM), and output stage scaling.

Every SMPS has at least one output stage, classically one PMOS and one NMOS transistor connected in series between the battery and ground, with the energy storage component connected between the common transistor node and the load. When the SMPS is delivering high output current, efficiency is maximized by maximizing the size of the switching transistors, to minimize conduction losses due to the transistor resistance ($R_{ON}$). On the other hand, when the output current demand is small, efficiency is maximized by using small switching transistors, to minimize the gate drive losses associated with charging and discharging the gate capacitances. A flexible approach, in systems where the load current may vary (such as a system that switches between OPPs), is to configure a plurality of output stages, each comprising a pair of switching transistors, and selectively enable an appropriate number of the stages, to deliver the desired output current to the load(s). This raises the challenge of how to select the optimal number of output stages depending the loading, to optimize the SMPS efficiency. Several approaches to this selection are known in the art.

A straightforward approach is to measure output current and adjust the number of output stages accordingly. In the prior art this method is variously known as on-line, adaptive, or dynamic scaling. This approach often suffers from timing issues. If the number of output stages is changed too rapidly, the SMPS may react to ripple on the loading current and cause instability, and/or unwanted spectral components at the output. If the number of output stages is changed too slowly, efficiency or/and performance may suffer if the loading changes more rapidly than expected. One example of rapid changes in current loading is when changing OPPs. A proportional-integral-derivative (PID) control loop would be one compromise to satisfy the worst case requirements; however, in that case efficiency cannot be maximized. For more information, consult the paper by Oliver Trescases, et al., "A Digitally Controlled DC-DC Converter Module with a Segmented Output Stage for Optimized Efficiency," published in the Proceedings of the $18^{th}$ International Symposium on Power Semiconductor Devices & ICs, 2006, which is incorporated herein by reference in its entirety.

Another known approach is to define a look-up table (LUT) that contains an output stage configuration for each OPP. Since proper operation of the electronic device is more important than maximizing its battery life, the stored output stage configurations must cover the worst case current consumption. This must be estimated taking into account factors such as operating conditions, temperature, aging, process variation of the IC consuming the power, different use cases, and the software version running on the IC consuming the power. Additionally, conservative design would mandate a margin to ensure the required quality level. As a result, the output stage configuration stored in the LUT for a given OPP is almost certainly too conservative, and in actual operation the SMPS will not approach optimal efficiency.

The Background section of this document is provided to place embodiments of the present invention in technological and operational context, to assist those of skill in the art in understanding their scope and utility. Unless explicitly identified as such, no statement herein is admitted to be prior art merely by its inclusion in the Background section.

SUMMARY

The following presents a simplified summary of the disclosure in order to provide a basic understanding to those of skill in the art. This summary is not an extensive overview of the disclosure and is not intended to identify key/critical elements of embodiments of the invention or to delineate the scope of the invention. The sole purpose of this summary is to present some concepts disclosed herein in a simplified form as a prelude to the more detailed description that is presented later.

According to one or more embodiments described and claimed herein, a method of optimizing the number of output stages of a switched mode power supply features a dynamically-updated lookup table (LUT) storing historic output stage configuration data per system operating performance point (OPP). Upon entering an OPP, a margin is added to the historic optimal configuration. During operation at the OPP, the current drawn by the load is periodically monitored, and the number of output stages is dynamically adjusted, as needed (with low pass filtering to ensure stability). When the system exits the OPP, a running average of the optimal number of output stages for the OPP is updated with the actual number of output stages enabled in this iteration of the OPP. A running average of the deviation, or change in number of output stages enabled, is also maintained. The updated values are written to the LUT, for use in setting the initial output stage configuration the next time the same OPP is invoked. This methodology is adaptive and self-learning, and automatically accounts for variations such as temperature, aging, process variation, software changes, and the like.

One embodiment relates to a method of selecting an output stage configuration per selected OPP for a SMPS having a plurality of independently-selectable, parallel output stages. Each output stage is operative to supply current to a load. The power supply is operative in a system that switches between discrete OPPs. Upon receiving notice that the system has switched to a first OPP, historic output stage configuration data associated with the first OPP is retrieved. The output stages are configured according to the historic output stage configuration data. During operation at the first OPP, a current drawn by the load is periodically monitored. The output stage configuration is adjusted based on the current monitoring. Upon receiving notice that the system has switched to a second OPP, the historic output stage configuration data associated with the first OPP is updated to associated location in LUT to reflect the output stage adjustment.

Another embodiment relates to a power management unit (PMU) operative in a system that switches between discrete OPPs. The PMU includes a switched mode power supply having a plurality of independently-selectable, parallel output stages. Each output stage comprises two switches connected in series across a power supply, and each output stage is operative to supply current to a load when enabled. The PMU also includes comparators operative to compare a voltage across a switch of an output stage to predetermined high and low voltage threshold values. The PMU further includes a lookup table operative to store, for each OPP, historic output stage configuration data. The PMU additionally includes a controller. The controller is operative to, upon receiving notice that the system has switched to a first OPP, retrieve historic output stage configuration data associated with the first OPP; configure the output stages according to the historic output stage configuration data; during operation at the first OPP, periodically monitor the switch voltage threshold comparisons; adjust the output stage configuration so as to maintain the switch voltage between the high and low threshold values; and upon receiving notice that the system has switched to a second OPP, update the historic output stage configuration data associated with the first OPP to reflect the output stage adjustment.

BRIEF DESCRIPTION OF THE DRAWINGS

The present invention will now be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

FIG. 5 is a data structure block diagram of the contents of the lookup table of FIG. 2.

DETAILED DESCRIPTION

For simplicity and illustrative purposes, the present invention is described by referring mainly to an exemplary embodiment thereof. In the following description, numerous specific details are set forth in order to provide a thorough understanding of the present invention. However, it will be readily apparent to one of ordinary skill in the art that the present invention may be practiced without limitation to these specific details. In this description, well known methods and structures have not been described in detail so as not to unnecessarily obscure the present invention.

Figure 1:
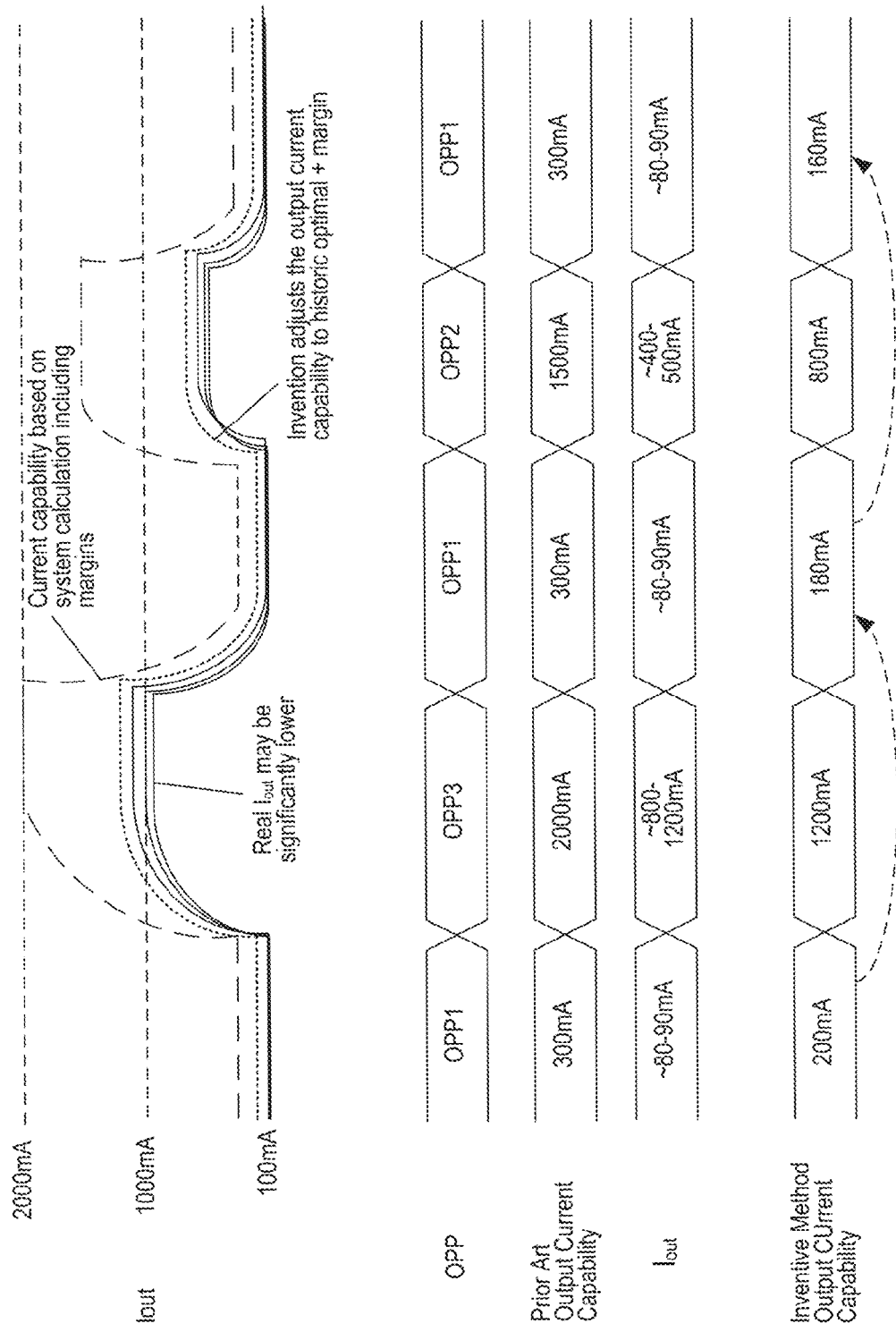
FIG. 1 is a graph of SMPS output currents in prior art and inventive methods.

FIG. 1 depicts the output current $I_{OUT}$ of a SMPS under both prior art, and inventive, output stage configuration control methods, as a system transitions between three operating performance points. These include a high-current OPP3, a medium-current OPP2, and a low-current OPP1. Prior art SMPS output stage estimation techniques, as depicted by the dashed line graph, must account for numerous environmental and process factors, and add a margin. Accordingly, they configure a number of output stages that provide far too much current for each selected OPP. The excess current reduces SMPS efficiency due to unnecessary gate drive losses associated with charging and discharging the gate capacitances of more switching transistors than necessary to support the actual current load requirement, indicated by solid lines (the multiple lines represent the actual current in different iterations of the OPPs).

According to embodiments of the present invention, and as indicated by the dotted line in FIG. 1, a SMPS output current $I_{OUT}$ exceeds the actual current requirements by a small margin, increasing the efficiency of the SMPS and reducing overall system power consumption. The current additionally is dynamic between iterations of an OPP. For example, note that the prior art output current for OPP1 is 300 mA for each iteration of OPP1—even though the actual current consumption is far below this value, i.e., approximately 80-90 mA. The output current does not change because the number of SMPS output stages to be enabled is constant for every invocation of OPP1.

According to embodiments of the present invention, the number of output stages enabled is optimized to the actual load demands during operation in OPP1, with a small margin added. Historic output stage configuration information, i.e., in the form of a running average of the optimal number of output stages, is maintained over numerous iterations of OPP1, to more closely track the actual, real-world current demand during that operating performance point. Since the historic output stage configuration data is updated to reflect actual performance for each OPP iteration, the configuration may change between iterations of the same OPP. This is indicated by the lower-most current values, which decrease over each iteration of OPP1, yielding different output currents $I_{OUT}$, which change from 200 mA to 180 mA to 160 mA.

Figure 2:
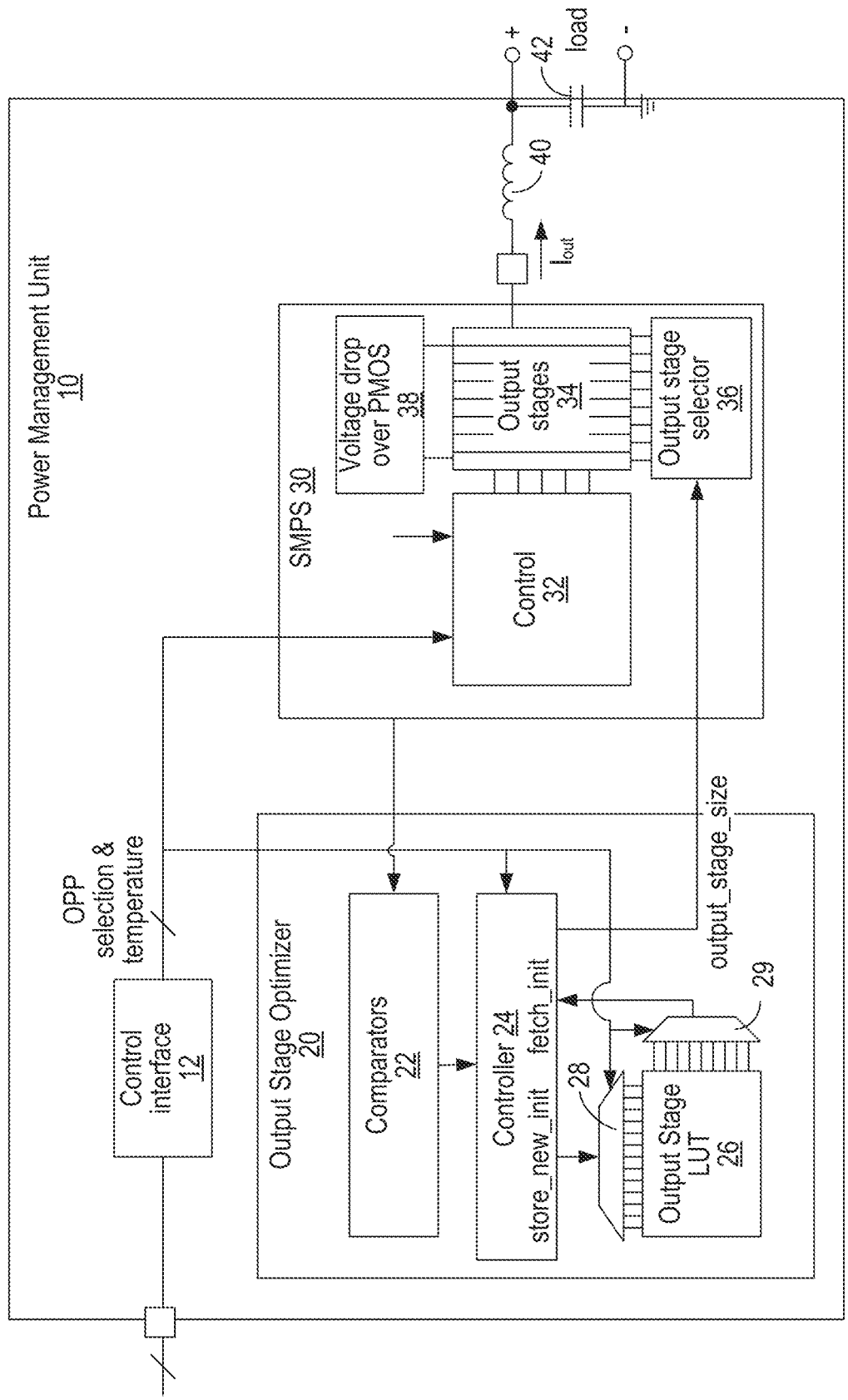
FIG. 2 is a functional block diagram of a power management unit.

FIG. 2 depicts a Power Management Unit (PMU) 10 according to one embodiment of the present invention. The PMU 10 includes a control interface 12, an Output Stage Optimizer (OSO) 20, and a Switched Mode Power Supply (SMPS) 30. The control interface 12 provides the current system OPP.

The SMPS 30 includes a control block 32 operative to generate switching control signals and a plurality of output stages 34, each comprising, e.g., a pair of series-connected switching transistors connected across a power source, such as a battery. An energy storage component in the form of an inductor 40 transfers power to a load. An output capacitor 42 conditions the supplied voltage, such as by smoothing out ripples caused by switching the transistors. As known in the art, by controlling the operation of the switching transistors, the control block 32 may implement a buck or boost mode power supply, as required depending on the state of charge of the battery.

A voltage detection circuit 38 periodically monitors the voltage drop across one transistor in at least one output stage, such as a PMOS transistor, and provides the voltage to the OSO 20. The OSO 20 compares the PMOS voltage to high and low voltage threshold values in two comparators in circuit 22.

A controller 24 executes a statistical algorithm that optimizes the number of output stages enabled, based on the voltage comparisons. The algorithm initializes the output stage configuration according to historic data retrieved from a lookup table (LUT) 26 at the beginning of each OPP iteration, selected by the current OPP value at multiplexer 28. In an embodiment, the LUT 26 may be implemented as a memory array indexed by the OPP value. The output stage configuration is provided to the output stage selector circuit 36, which implements the selection by selectively enabling individual output stages 34. During operation, the number of output stages enabled is optimized by monitoring the voltage comparisons in circuit 22, and adjustments are communicated to the output stage selector circuit 36. The control algorithm tracks the number of stages enabled, and the deviations in that number as adjustments are made. At the end of each OPP iteration, the historic output stage configuration data are updated to reflect activity in the current iteration, and the updated data are saved to the LUT 26, also associated with (or indexed by) the OPP, as indicated by the demultiplexer 29. The controller 24 may be implemented in hardware, e.g., as a finite state machine; in programmable logic together with appropriate firmware; or as a processor or DSP together with appropriate software.

Figure 3:
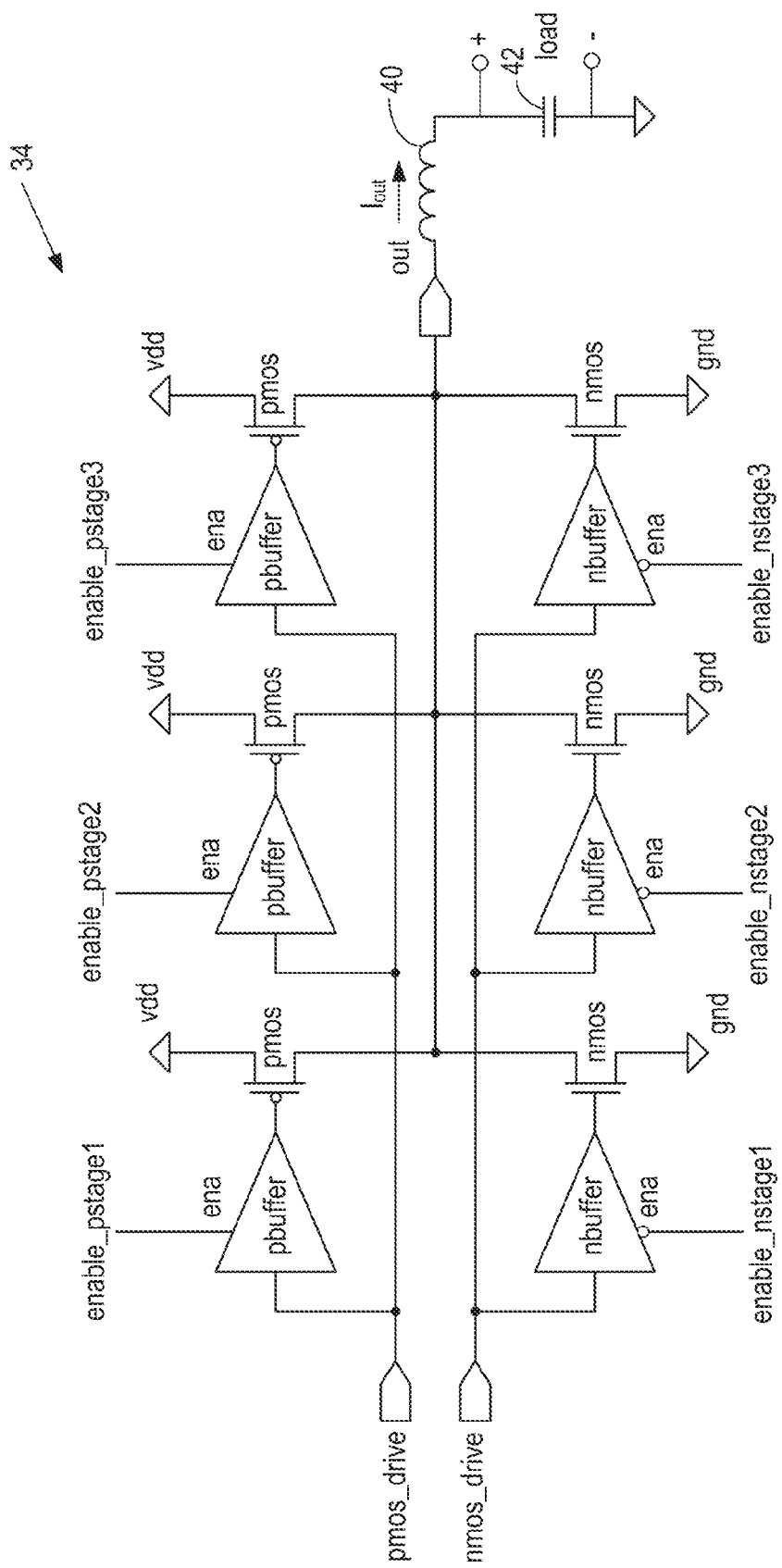
FIG. 3 is an electrical schematic diagram of the SMPS output stages of FIG. 2.

FIG. 3 depicts the output of a representative SMPS having three output stages. The switching transistors in each output stage may be equally sized, or they may be differently sized to create a desired weighting, such as binary. Pmos_drive and nmos_drive signals are the control signals generated by the control block 32, and which drive the gate inputs of PMOS and NMOS switching transistors, respectively. A gated buffer is interposed between the pmos_drive/nmos_drive signals and each transistor gate terminal. The buffers are selectively enabled by enable_pstagen and enable_nstagen signals provided by the output stage selector circuit 36.

In this example, if e.g. enable_pstage2 is high and enable_nstage2 is low, the pmos_drive and nmos_drive signals are propagated to the gates of the stage 2 PMOS and NMOS transistors, respectively, enabling the second stage to participate in providing output current to the load. Conversely, if enable_pstage2 is low, the second stage pbuffer outputs Vdd (e.g., $V_{battery}$). If enable_nstage2 is high, the second stage nbuffer outputs GND (e.g., 0 V). In this case, both PMOS and NMOS transistors of the second stage are OFF, and no current flows from the second stage. In this manner, any number from 1 to n of an n-stage output can be selectively enabled, based on the real-time current demands of the load. Note that three output stages are depicted in FIG. 3 for simplicity, and this number is not limiting. In general, any number of output stages may be provided and optimally controlled by embodiments of the present invention, as required or desired for a given system design.

Embodiments of the present invention control the output current $I_{OUT}$ of the SMPS 30. To do this, they periodically monitor the magnitude of the current through, e.g., the PMOS transistor of at least one output stage. For convenience, the electrical quantity actually monitored is the voltage drop across the transistor. Those of skill in the art will readily appreciate that the voltage across the "on" resistance of a transistor is proportional to the current through it, according to Ohms Law.

Figure 4:
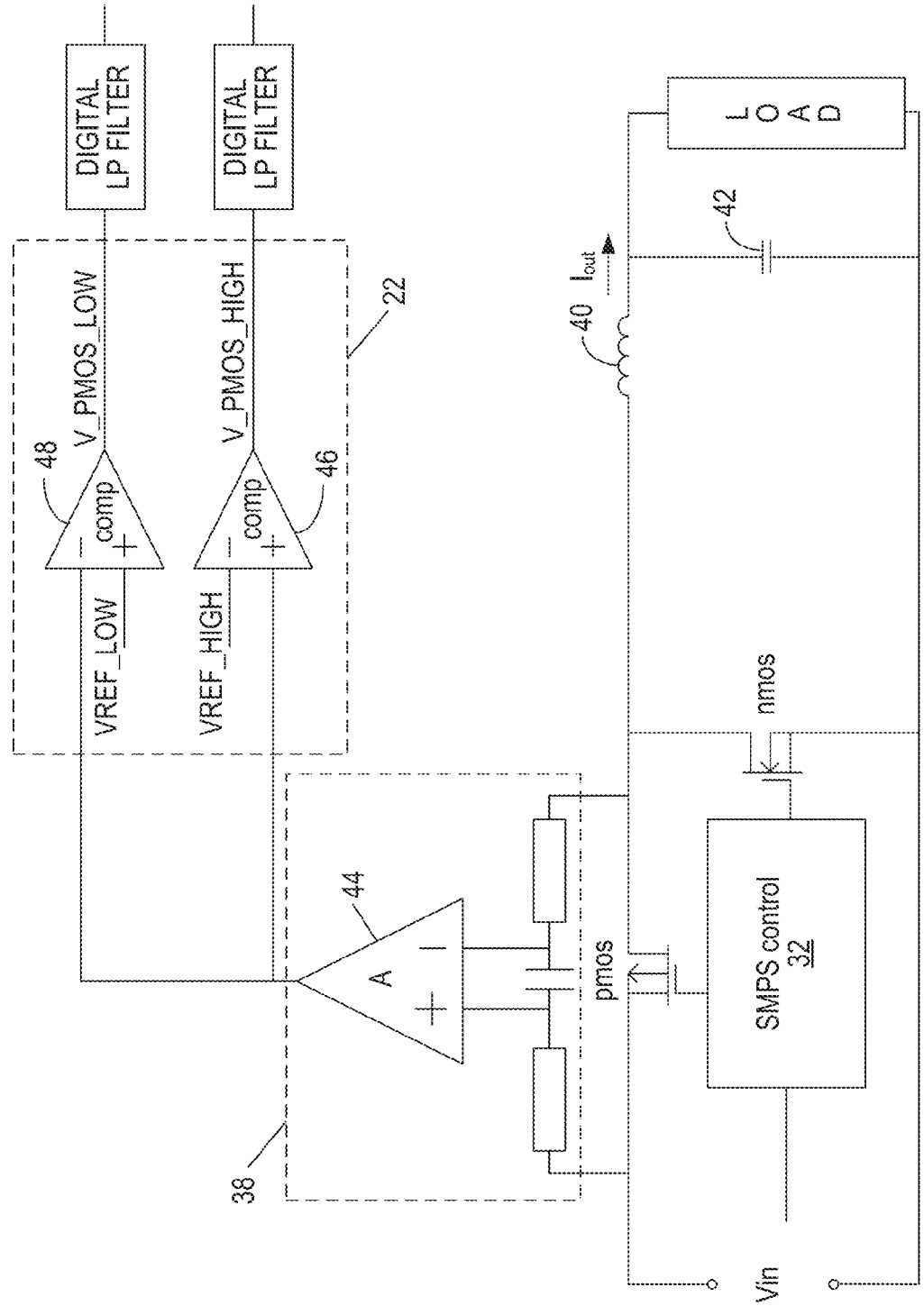
FIG. 4 is a functional block diagram of the voltage measuring circuit of FIG. 2.
Figure 6A:
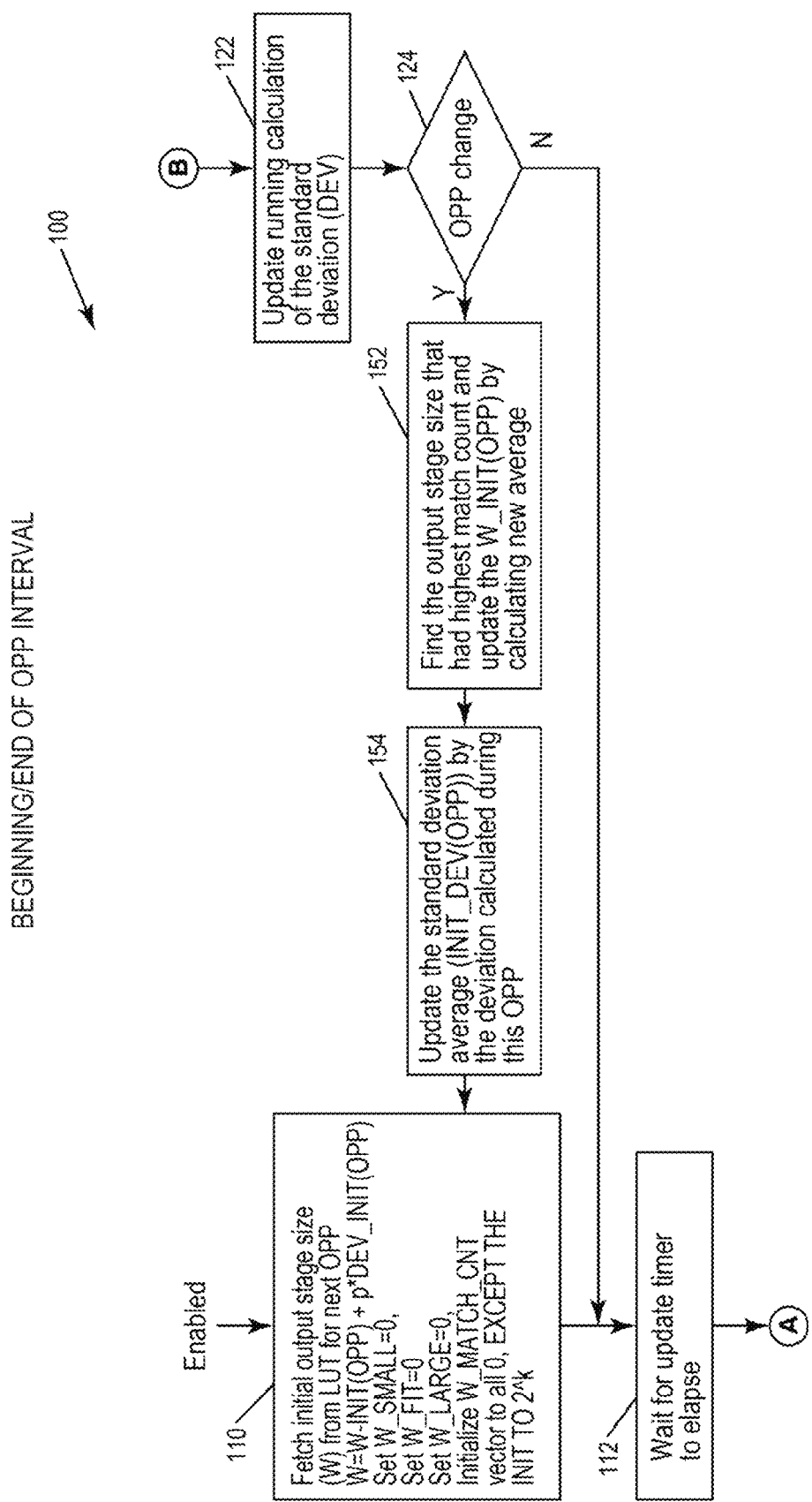
FIGS. 6A-6D are a flow diagram of a method executed by a controller in the power management unit of FIG. 2.
Figure 6B:
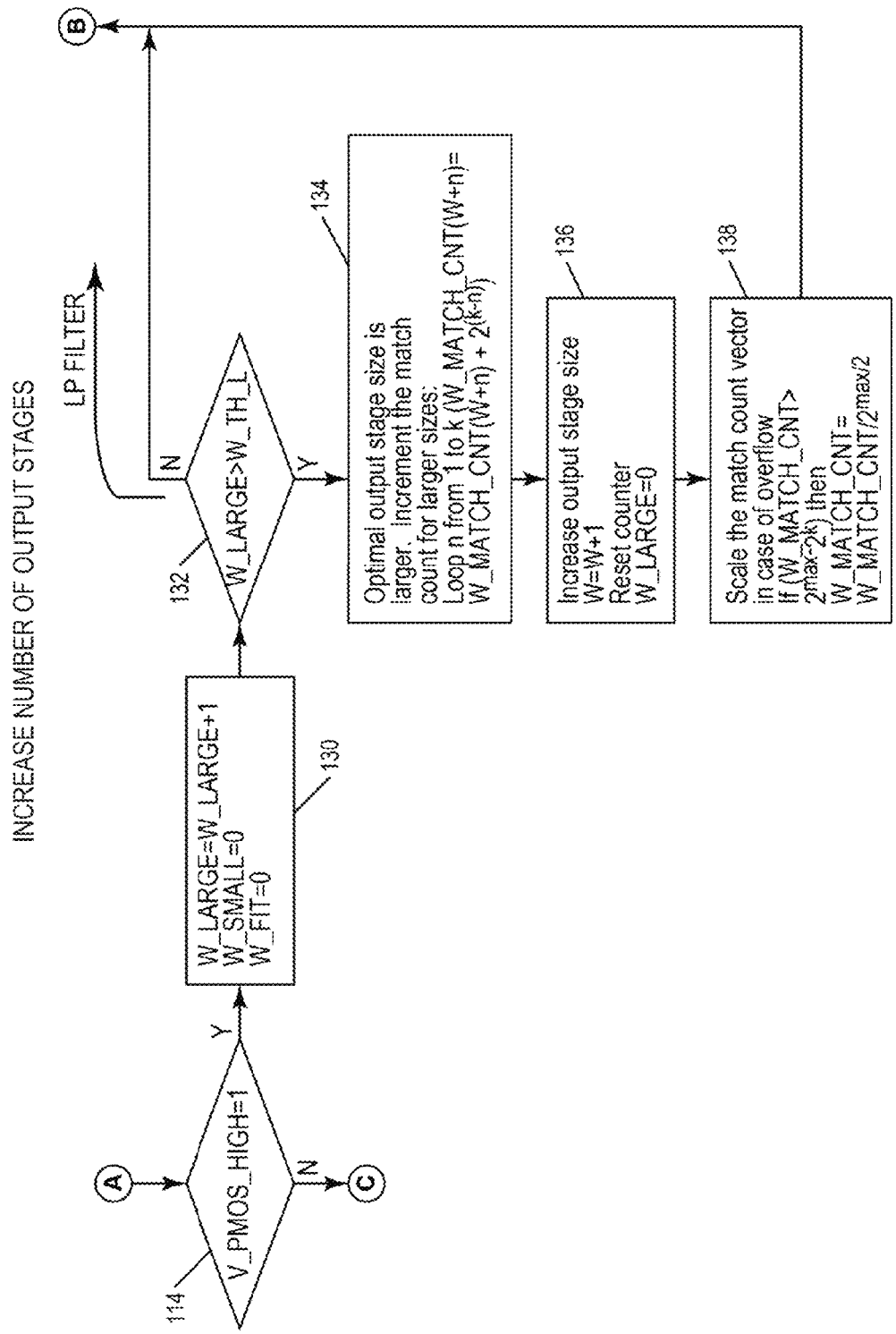
Figure 6C:
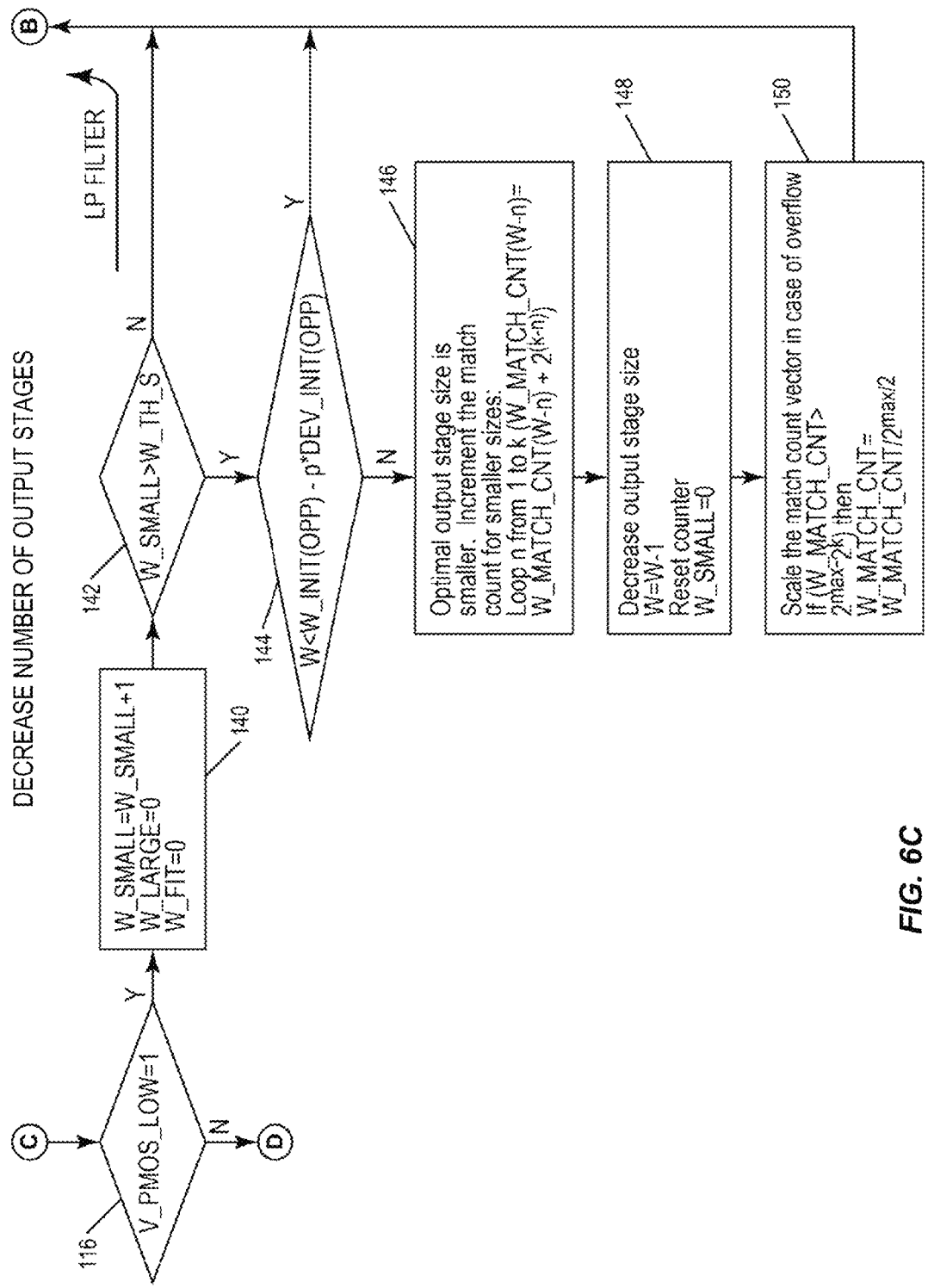
Figure 6D:
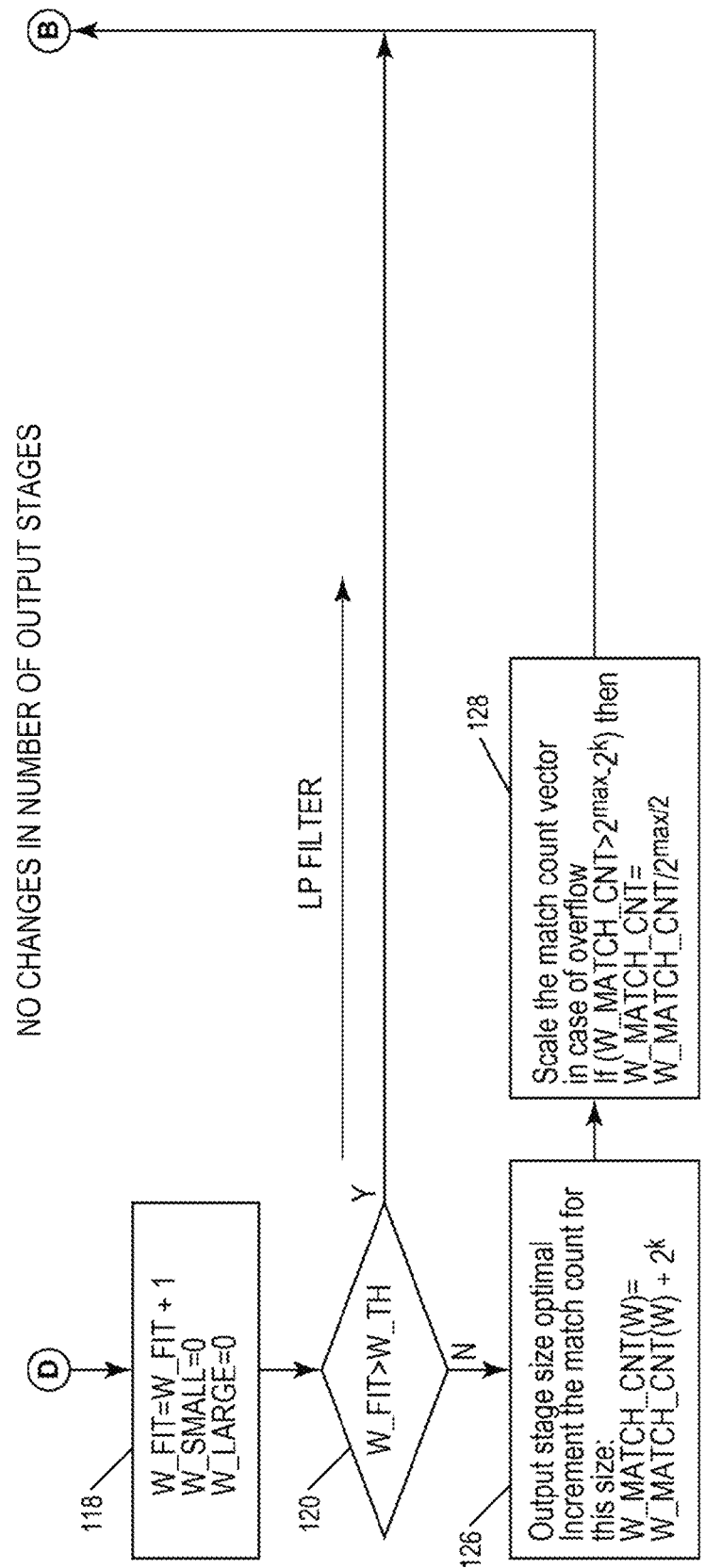

FIG. 4 depicts the voltage measuring circuit 38, and related comparators in the circuit 22. An amplifier 44 senses the voltage drop across the PMOS transistor in an output stage. This PMOS voltage is compared to both high and low threshold voltage values at comparators 46 and 48, respectively, in the circuit 22. As discussed more fully below, a low pass filtering function is implemented by the controller 24 as part of the statistical processing algorithm. The algorithm requires the respective threshold to have been crossed during multiple, consecutive monitoring periods, prior to concluding that the PMOS voltage is too high or too low, and thus requiring an adjustment to the number of output stages enabled.

FIG. 5 depicts one representation of the data structures that may be maintained in the LUT 26. As used herein, the number of SMPS output stages enabled is represented by the variable W. W_INIT is the initial, optimal value of W for a particular OPP, based on historic statistics. For example, in one embodiment, W_INIT is a running average of the optimal number W of output stages for the selected OPP, over numerous iterations of that OPP. DEV is the deviation in number of output stages enabled during each iteration of the OPP. DEV_INIT is the initial deviation, which in one embodiment is a running average of deviations over numerous iterations of the OPP.

A multiple of the DEV_INIT value is added to W_INIT at the beginning of an OPP, to provide a conservative margin of $I_{OUT}$ over its anticipated required value. The array p contains values of the multiplying factor, which may be different for different OPPs. Because the value DEV is a count of output stages enabled or disabled, it is necessarily integer. The product p*DEV must be an integer value for the same reason. Hence, the multiplier p is necessarily an integer as well. The value p is predetermined, and may be set differently per OPP. If a particular OPP is known to have widely varying load current demands—for example, a wireless transceiver circuit being enabled, for which incoming communications cannot be accurately predicted—a higher margin may be provided by specifying a higher value for p. This ensures proper operation, at the expense of optimal efficiency, for that OPP.

As detailed further herein, the control algorithm of the present invention is adaptive and self-learning by updating the values stored in the W_INIT and DEV_INIT arrays. Values in the p array are predetermined and do not change. In other embodiments, the LUT 26 may store information in addition to the W_INIT, DEV_INIT, and p arrays.

FIG. 6 is a flow diagram of an algorithm, executed by the controller 24, for selecting the optimal number of SMPS output stages 34 for a particular OPP. The variables in FIG. 6 have the following meanings and types:

| Variable | Meaning | Type |
| --- | --- | --- |
| OPP | Operational Performance Point | Integer |
| W | Number of SMPS output stages enabled | Integer |
| DEV | Deviation (change) in number of output stages enabled | Integer |
| W_INIT(OPP) | Initial optimal values of W for each OPP | Vector |
| DEV_INIT(OPP) | Initial values of stage number deviation for each OPP | Vector |
| V_PMOS_HIGH | PMOS Voltage exceeds VREF_HIGH | Binary |
| V_PMOS_LOW | PMOS Voltage less than VREF_LOW | Binary |
| W_LARGE | Number of V_PMOS_HIGH occurrences | Integer |
| W_SMALL | Number of V_PMOS_LOW occurrences | Integer |
| W_FIT | Number of occurrences PMOS voltage between VREF_HIGH and VREF_LOW | Integer |
| W_MATCH_CNT(W) | Count of "votes" for each possible number of output stages | Vector |
| W_TH_L | Threshold count of V_PMOS_HIGH for LP filter | Integer |
| W_TH_S | Threshold count of V_PMOS_LOW for LP filter | Integer |
| k | Predetermined factor for spreading votes in W_MATCH_CNT. k = 4 in the example here. | Integer |
| p | Predetermined margin factor. p = 3 in the example here. | Integer |
| n | Loop count variable in pseudo code | Integer |
| $2^{max}$ | Maximum value of a W_MATCH_CNT vector element | Integer |

The algorithm of FIG. 6 will be described by first considering an OPP in which no adjustment to the number of SMPS output stages 34 enabled is necessary. Next, the case where additional output stages are required is considered. Then, the case where fewer output stages are required is described. Finally, updating of the LUT 26 for all three cases is explained.

Initialization Upon New OPP

The method 100 begins each iteration when the Output Stage Optimizer 20 is informed by the control interface 12 that the system has selected a new OPP.

Block 110:

The initial optimal number W_INIT(OPP) of output stages, the initial deviation DEV_INIT(OPP), and a margin factor p—all associated with the selected OPP—are retrieved from the LUT 26. The initial number W of output stages to be enabled is calculated according to $$W = W\_INIT(OPP) + p * DEV\_INIT(OPP) \quad (1)$$

This ensures a conservative margin above the nominally optimal number of stages required, based on past history. A value of p=3 is assumed for this example. The count variables W_LARGE, W_SMALL, and W_FIT are all initialized to zero. All positions of the W_MATCH_CNT(W) vector are initialized to zero, with the exception that the vector position corresponding to the initial value of W (as determined by equation (1)) is initialized to $2^k$. The variable k is a predetermined "spreading factor." A value of k=4 is assumed for this example.

Block 112:

The PMOS voltage is monitored periodically. In one embodiment, the PMOS voltage is sampled at every expiration of an update timer.

PMOS Voltage Remains Between Thresholds; No Change in Output Stage Configuration Block 114:

The PMOS voltage is compared to VREF_HIGH at comparator 46. It does not exceed the reference voltage, so V_PMOS_HIGH=0.

Block 116:

The PMOS voltage is compared to VREF_LOW at comparator 48.

Although depicted in FIG. 6 as sequential, this comparison is in fact in parallel with the comparison at block 114. The PMOS voltage does not fall below the reference voltage, so V_PMOS_LOW=0.

Block 118:

Because the PMOS voltage remained between the reference values VREF_HIGH and VREF_LOW for this measurement period, the count variable W_FIT is incremented, and the count variables corresponding to the PMOS voltage being above or below the thresholds are reset.

Block 120:

The count variable W_FIT is compared to a predetermined count threshold W_TH. This test, and the NO path from block 120, implements a low pass filter. The PMOS voltage must remain between the high and low thresholds for a predetermined number of consecutive monitoring periods before the W_MATCH_CNT(W) vector is incremented. Since this is the first monitoring period of this OPP interval, control flows to block 122.

Block 122:

The deviation DEV is updated. In this case, there is no change.

Block 124:

Has the system switched to a new OPP? In this case, it has not, and control flows again to block 112, to await the next monitoring period.

Blocks 112, 114, 116, 118, 120:

Assume numerous monitoring periods have expired, with the PMOS voltage remaining between the thresholds. In this case, the count W_FIT exceeds its threshold value, and control flows to block 126.

Block 126:

The currently selected number W of output stages is determined to be optimal for the current OPP, as the load has demanded neither significantly more nor less current than that provided, over numerous monitoring periods. The algorithm "votes" for this value of W with a heavily weighted vote, by incrementing the match count for this number of output stages:

$$W\_MATCH\_CNT(W)=W\_MATCH\_CNT(W)+2^k \quad (2)$$

Block 128:
Because the system may remain at a particular OPP indefinitely, the match count vector may overflow. Accordingly, after each update the entire vector is scaled:

$$\text{If } (W\_MATCH\_CNT>2^{max}-2^k) \text{ then}$$
$$W\_MATCH\_CNT=W\_MATCH\_CNT/2^{max/2} \quad (3)$$

Block 122:
The deviation DEV is updated. Since the output stage configuration remained stable, DEV is decreased slightly.

PMOS Voltage Exceeds VREF HIGH; Increase Number of Output Stages Enabled

The case where the load demands higher current is now described. Assume the method 100 is at block 112, and a new monitoring period is defined.
Block 114:
The PMOS voltage is compared to VREF_HIGH at comparator 46. It exceeds the reference voltage, so V_PMOS_HIGH=1.
Block 130:
The count variable W_LARGE is incremented, and the count variables corresponding to the PMOS voltage being below the low threshold, or between the thresholds, are reset.
Block 132:
The count variable W_LARGE is compared to a predetermined count threshold W_TH_L. This test, and the NO path from block 132, implements a low pass filter. The PMOS voltage must remain above the high threshold for a predetermined number of consecutive monitoring periods before the W_MATCH_CNT(W) vector is incremented. Since this is the first measurement period in which V_PMOS_HIGH=1, control flows to block 122.
Block 122:
The deviation DEV is updated. Since W has not been adjusted, there is no change yet.
Block 124:
Has the system switched to a new OPP? In this case, it has not, and control flows again to block 112, to await the next monitoring period.
Blocks 114, 130, 132:
Assume numerous monitoring periods have expired, with the PMOS voltage remaining above the VREF_HIGH threshold. In this case, the count W_FIT exceeds its threshold value, and control flows to block 134.
Block 134:
The optimal output stage configuration enables more output stages than are currently enabled. Votes are entered for a plurality of number of stages greater than the current one, with decreasing weights:

$$\text{For } n=1 \text{ to } k, W\_MATCH\_CNT(W+n)=W\_MATCH\_$$
$$CNT(W+n)+2^{(k-n)} \quad (4)$$

The threshold comparison at comparator 46 only indicates that more output stages are required than are currently enabled; it does not indicate how many more. By "voting" for a plurality of output stage configurations in the "greater than" direction, and giving the votes decreasing weight, the algorithm is more stable, and more rapidly converges on the optimal number of output stages, than by voting for only the incremented number of stages. The loop is truncated if W+n reaches the largest number of output stages.
Block 136:
The number W of output stages is incremented, to provide greater output current. The count variable W_LARGE is reset.
Block 138:
The match count vector is scaled to prevent overflow, using equation (3):

$$\text{If } (W\_MATCH\_CNT>2^{max}-2^k) \text{ then}$$
$$W\_MATCH\_CNT=W\_MATCH\_CNT/2^{max/2} \quad (3)$$

Block 122:
Since an additional output stage was enabled in this monitoring period, the deviation DEV is incremented.
Block 124:
Has the system switched to a new OPP? In this case, it has not, and control flows again to block 112, to await the next monitoring period.

PMOS Voltage is Less than VREF LOW; Decrease Number of Output Stages Enabled

The case where the load demands less current is now described. Assume the method 100 is at block 112, and a new monitoring period is defined.
Block 114:
The PMOS voltage is compared to VREF_HIGH at comparator 46. It does not exceed the reference voltage, so V_PMOS_HIGH=0.
Block 116:
The PMOS voltage is compared to VREF_LOW at comparator 48. The PMOS voltage falls below the reference voltage, so V_PMOS_LOW=1.
Block 140:
The count variable W_SMALL is incremented, and the count variables corresponding to the PMOS voltage being above the high threshold, or between the thresholds, are reset.
Block 142:
The count variable W_SMALL is compared to a predetermined count threshold W_TH_S. This test, and the NO path from block 142, implements a low pass filter. The PMOS voltage must remain below the low threshold for a predetermined number of consecutive monitoring periods before the W_MATCH_CNT(W) vector is adjusted. Since this is the first measurement period in which V_PMOS_LOW=1, control flows to block 122.
Block 122:
The deviation DEV is updated. Since W has not been adjusted, there is no change.
Block 124:
Has the system switched to a new OPP? In this case, it has not, and control flows again to block 112, to await the next monitoring period.
Blocks 114, 116, 140, 142:
Assume numerous measurement periods have expired, with the PMOS voltage remaining below the VREF_LOW threshold. In this case, the count W_SMALL exceeds its threshold value, and control flows to block 144.
Block 144:
To prevent the possibility of excessively decreasing the number of output stages during one OPP iteration, the value of W is not allowed to decrease beyond its initial value less a multiple of the deviation applied so far in this OPP. Thus, the test is performed:

$$W < W\_INIT(OPP) - p*DEV \qquad (5)$$

If so, control flows to block 122, and further decrementing of W is skipped. If the number W of output stages has not already been decreased by this maximum allowed amount, control flows to block 146.

Block 146:

The optimal output stage configuration enables fewer output stages than are currently enabled. Votes are entered for a plurality of number of stages less than the current one, with decreasing weights:

$$\text{For } n=1 \text{ to } k, W\_MATCH\_CNT(W-n) = W\_MATCH\_CNT(W-n) + 2^{(k-n)} \qquad (6)$$

The threshold comparison at comparator 48 only indicates that fewer output stages are required than are currently enabled; it does not indicate how many fewer. By "voting" for a plurality of output stage configurations in the "less than" direction, and giving the votes decreasing weight, the algorithm is more stable, and more rapidly converges on the optimal number of output stages, than by voting for only the decremented number of stages. The loop is truncated if W-n reaches the smallest number of output stages.

Block 148:

The number W of output stages is decremented, to more efficiently provide lower output current. The count variable W_SMALL is reset.

Block 150:

The match count vector is scaled to prevent overflow, using equation (3):

$$\text{If } (W\_MATCH\_CNT > 2^{max} - 2^k) \text{ then}$$
$$W\_MATCH\_CNT = W\_MATCH\_CNT/2^{max/2} \qquad (3)$$

Block 122:

Since an additional output stage was disabled in this monitoring period, the deviation DEV is decremented.

Exit OPP; Update LUT

Block 124:

For any of the above three cases (no change in output stages; additional output stages enabled; or fewer output stages enabled), upon receiving notice from the control interface 12 than the system has switched to a new OPP, the method 100 directs control flow to block 152.

Block 152:

The W_MATCH_CNT vector is inspected. The optimal number of output stages for the preceding iteration of the OPP corresponds to the position of the W_MATCH_CNT vector having the largest value. The value in the W_INIT(OPP) vector at this OPP is a running average of the optimal number of output stages over a predetermined number of iterations of the OPP. This value is updated by recalculating the running average, including the optimal value just determined from inspection of the W_MATCH_CNT vector. The updated value is stored to the LUT 26.

Block 152:

The deviation DEV includes the net number of changes in the number W of output stages enabled during the OPP. The value in the DEV_INIT(OPP) vector for this OPP is a running average of the deviations in the number of output stages over a predetermined number of iterations of the OPP. This value is updated by recalculating the running average, including the deviation value for this iteration of the OPP. The updated value is stored to the LUT 26.

Block 110:

The method 100 repeats for the new OPP.

Figure 7A:
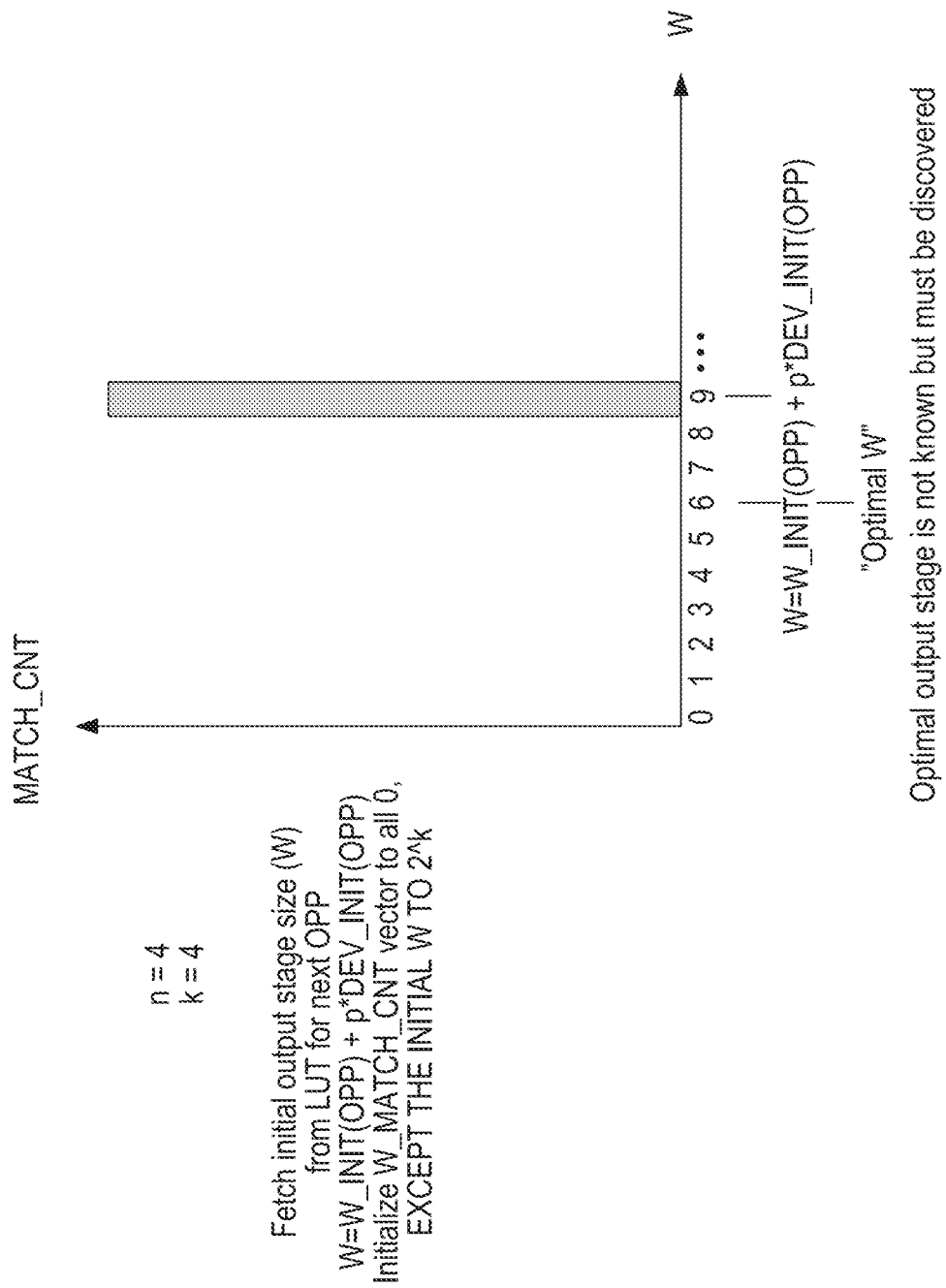
FIGS. 7A-7E are data structure diagrams detailing the operation of the method of FIG. 6.

FIGS. 7A-7E depict changes in the W_MATCH_CNT(W) vector over the duration of one OPP. In this example, the method 100 operates to decrease the number W of output stages enabled from an initial value of 9 to an optimal (but initially unknown) value of 6. FIG. 7A depicts the initial condition. Upon executing block 110 of the method 100, the initial number W of output stages enabled is set to W=W_INIT(OPP)+p*DEV_INIT(OPP) according to equation (1), which equals 9 in this example. The position of the W_MATCH_CNT(W) vector corresponding to this value of W is initialized to $2^k=16$; all other vector positions are set to zero.

Figure 7B:
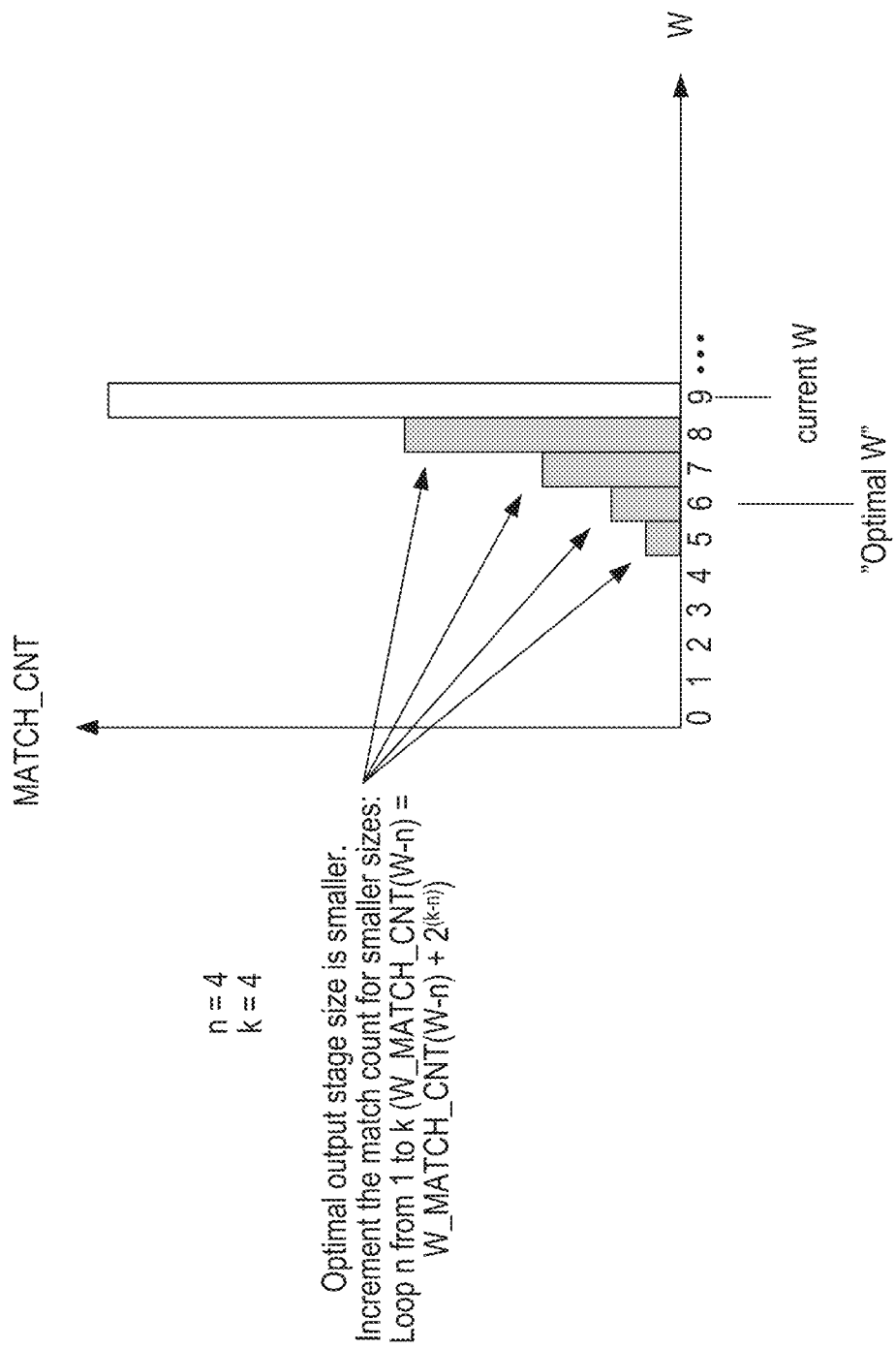

FIG. 7B depicts the first decrease in W, and the corresponding entry into the W_MATCH_CNT(W) vector of decreasingly weighted votes from the new W, in the "less than" direction. In particular, execution of the loop of equation (6):

$$\text{For } n=1 \text{ to } k, W\_MATCH\_CNT(W-n) = W\_MATCH\_CNT(W-n) + 2^{(k-n)} \qquad (6)$$

results in the following values being written to the corresponding positions of the W_MATCH_CNT(W) vector:
n=1 W_MATCH_CNT(8)=0+$2^{(4-1)}$=8
n=2 W_MATCH_CNT(7)=0+$2^{(4-2)}$=4
n=3 W_MATCH_CNT(6)=0+$2^{(4-3)}$=2
n=4 W_MATCH_CNT(5)=0+$2^{(4-4)}$=1

After adjusting the W_MATCH_CNT(W) vector in block 146, the value W is decremented in block 148 to a value of W=8.

Figure 7C:
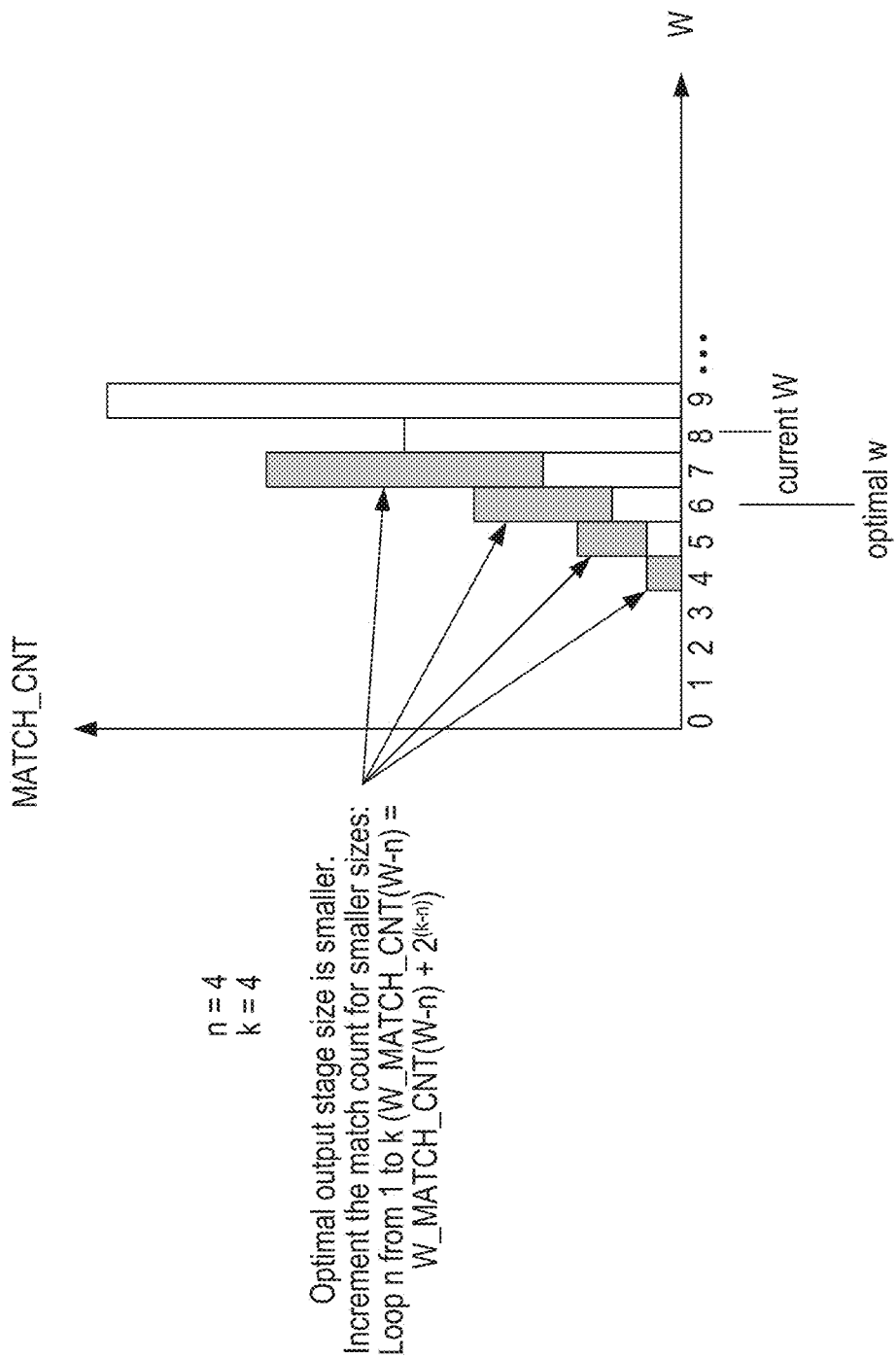

FIG. 7C depicts the next iteration. Assuming the load continues to draw such low current that the PMOS voltage falls below VREF_LOW over a sufficient number of consecutive monitoring periods to satisfy the low pass filter of block 132, the branch of blocks 142-150 will again be triggered. This time, the current value of W=8, and execution of equation (6) results in:
n=1 W_MATCH_CNT(7)=4+$2^{(4-1)}$=12
n=2 W_MATCH_CNT(6)=2+$2^{(4-2)}$=6
n=3 W_MATCH_CNT(5)=1+$2^{(4-3)}$=3
n=4 W_MATCH_CNT(4)=0+$2^{(4-4)}$=1

After this adjustment, the number W of output stages enabled is again decremented, to W=7.

Figure 7D:
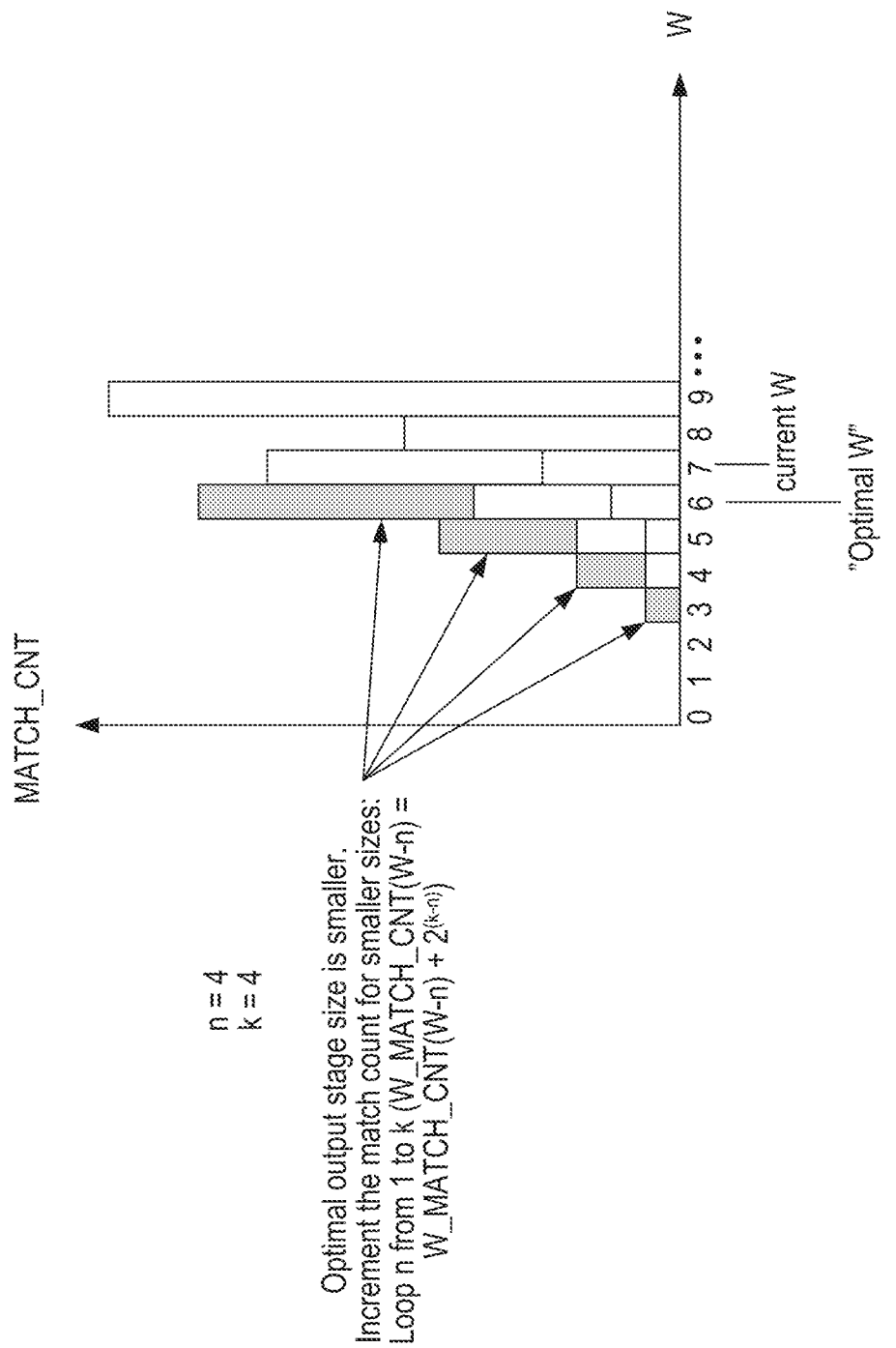

FIG. 7D depicts another iteration, during which the number W of output stages enabled is again decremented. This time, the current value of W=7, and execution of equation (6) results in:
n=1 W_MATCH_CNT(6)=6+$2^{(4-1)}$=14
n=2 W_MATCH_CNT(5)=3+$2^{(4-2)}$=7
n=3 W_MATCH_CNT(4)=1+$2^{(4-3)}$=3
n=4 W_MATCH_CNT(3)=0+$2^{(4-4)}$=1

After this adjustment, the number W of output stages enabled is again decremented, to W=6.

Figure 7E:
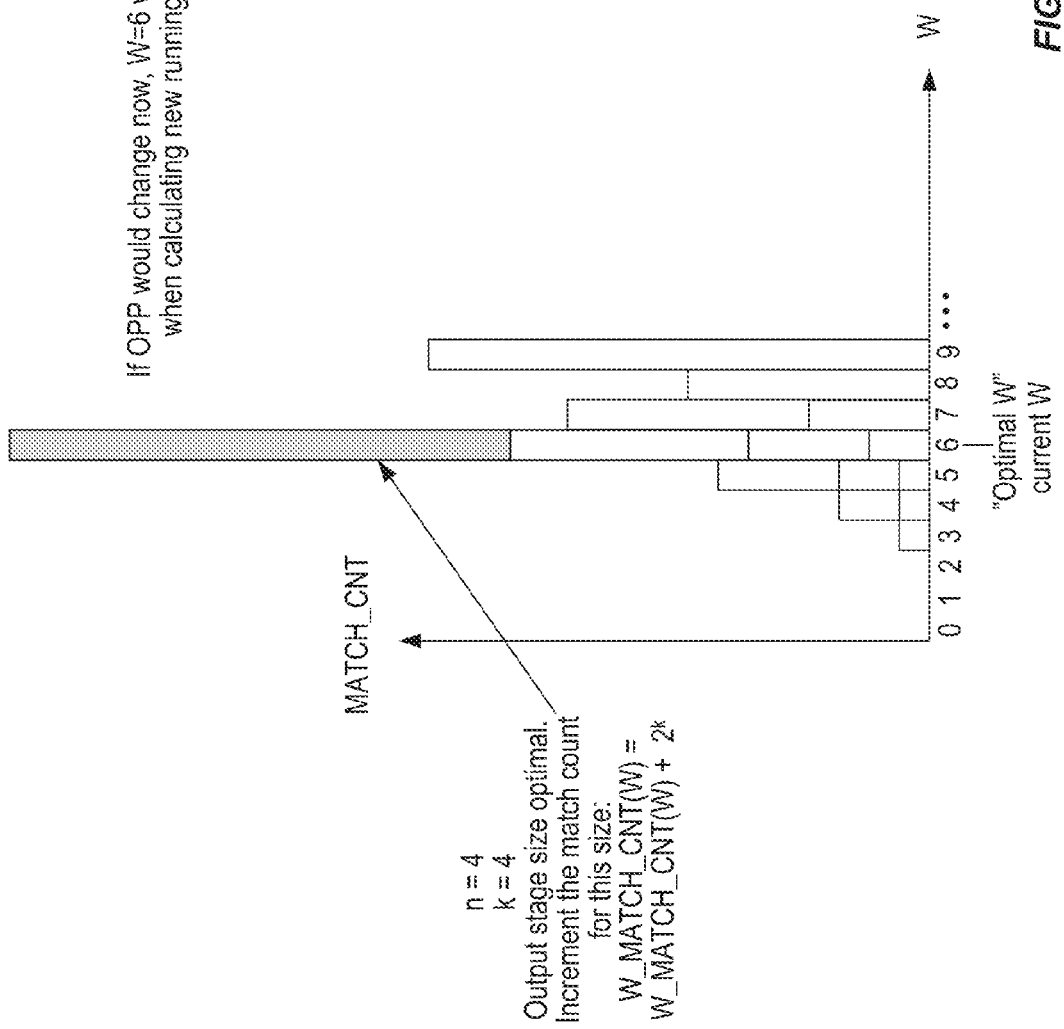

FIG. 7E depicts the last iteration, during which the load current caused the PMOS voltage to neither exceed the high voltage threshold nor fall below the low voltage threshold. After satisfying this condition for sufficient consecutive monitoring periods to satisfy the low pass filter of block 120, the W_MATCH_CNT(W) vector is updated in block 126 to add a large value to the current number W, which at this point equals 6. Executing equation (2):

$$W\_MATCH\_CNT(W) = W\_MATCH\_CNT(W) + 2^k \qquad (2)$$

yields W_MATCH_CNT(6)=14+16=30. If the system were then to switch to a new OPP, the value W=6 would be selected as the optimal number W of output stages, and the running average of such optimal values in OPP_INIT(OPP) would be updated to include this value, prior to updating the LUT 26.

Note that the example presented by FIGS. 7A-7E is a simple example presented to enable one of skill in the art to more readily understand the operation of the method 100. As such, the example is not limiting. Note that many steps were omitted for simplicity, such as scaling of the W_MATCH_CNT(W) vector by equation (3), at blocks 150 and 128.

Figure 8:
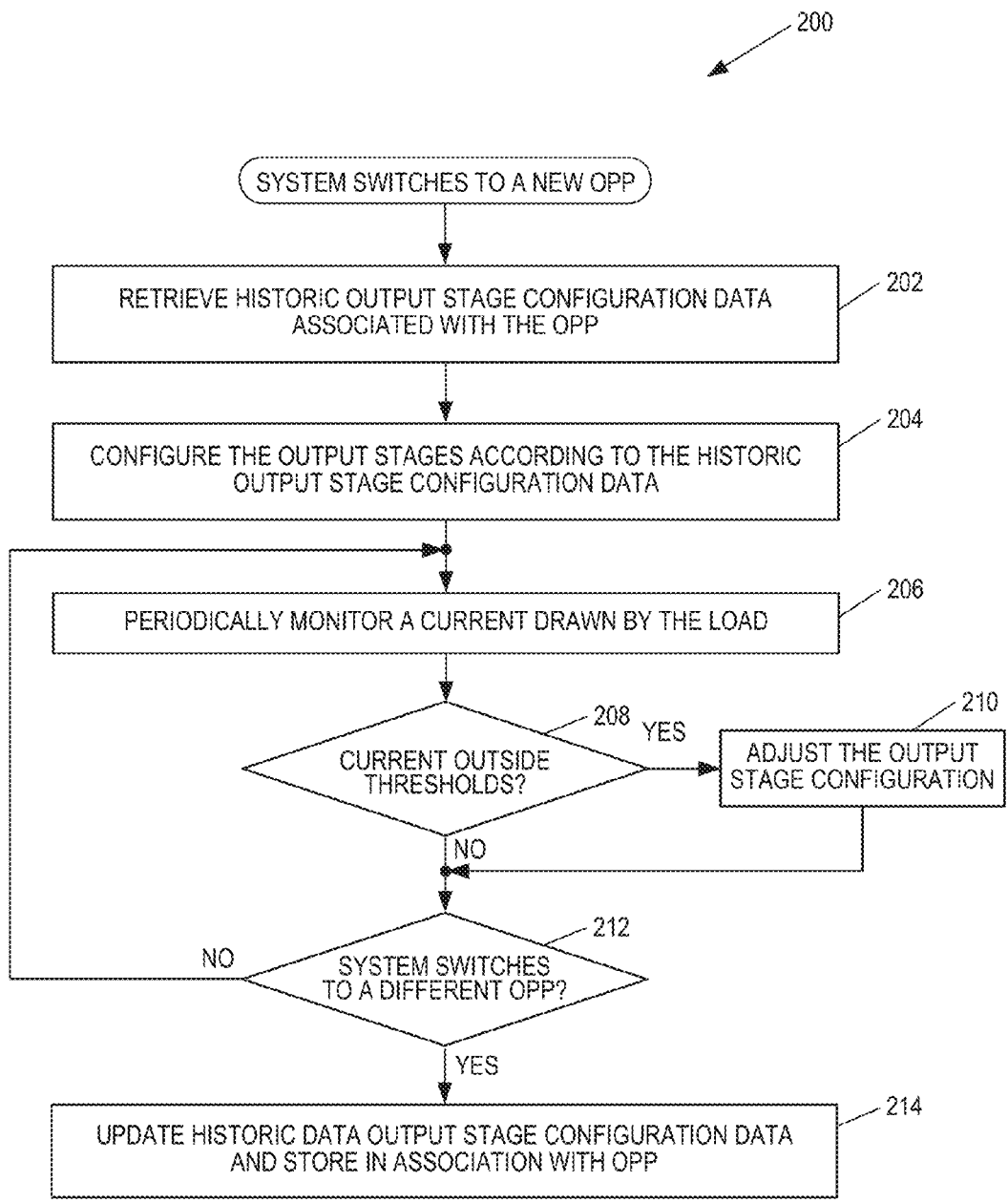
FIG. 8 is a flow diagram of a method of SMPS output stage configuration control.

FIG. 8 depicts a succinct view of a method 200 of selecting an output stage configuration per selected OPP for a SMPS 30 having a plurality of independently-selectable, parallel output stages 34, each operative to supply current to a load. The SMPS 30 is operative in a system that switches between discrete OPPs. The method 200 begins when the system switches to a new OPP. Historic output stage configuration data associated with the OPP is retrieved (block 202), such as from a LUT 26. The output stages are configured according to the historic output configuration data (block 204). For example, a number output stages enabled may be the historic optimum number of output stages for the OPP, plus a margin related to the historic deviation in output stages during the OPP. The SMPS output current drawn by a load is periodically monitored (block 206). If the actual current falls outside of either high or low threshold values (block 208), the output stage configuration is adjusted to bring the output current between the high and low thresholds (block 210). This monitoring/adjustment loop continues for the duration of the OPP (block 212). When the system switches to a new OPP (block 212), the historic output stage configuration data are updated to reflect adjustments made, and are stored in association with the OPP (block 214). For example, the updated historic output stage configuration data may be stored to the LUT 26. The method 200 then repeats with the new OPP.

Figure 9:
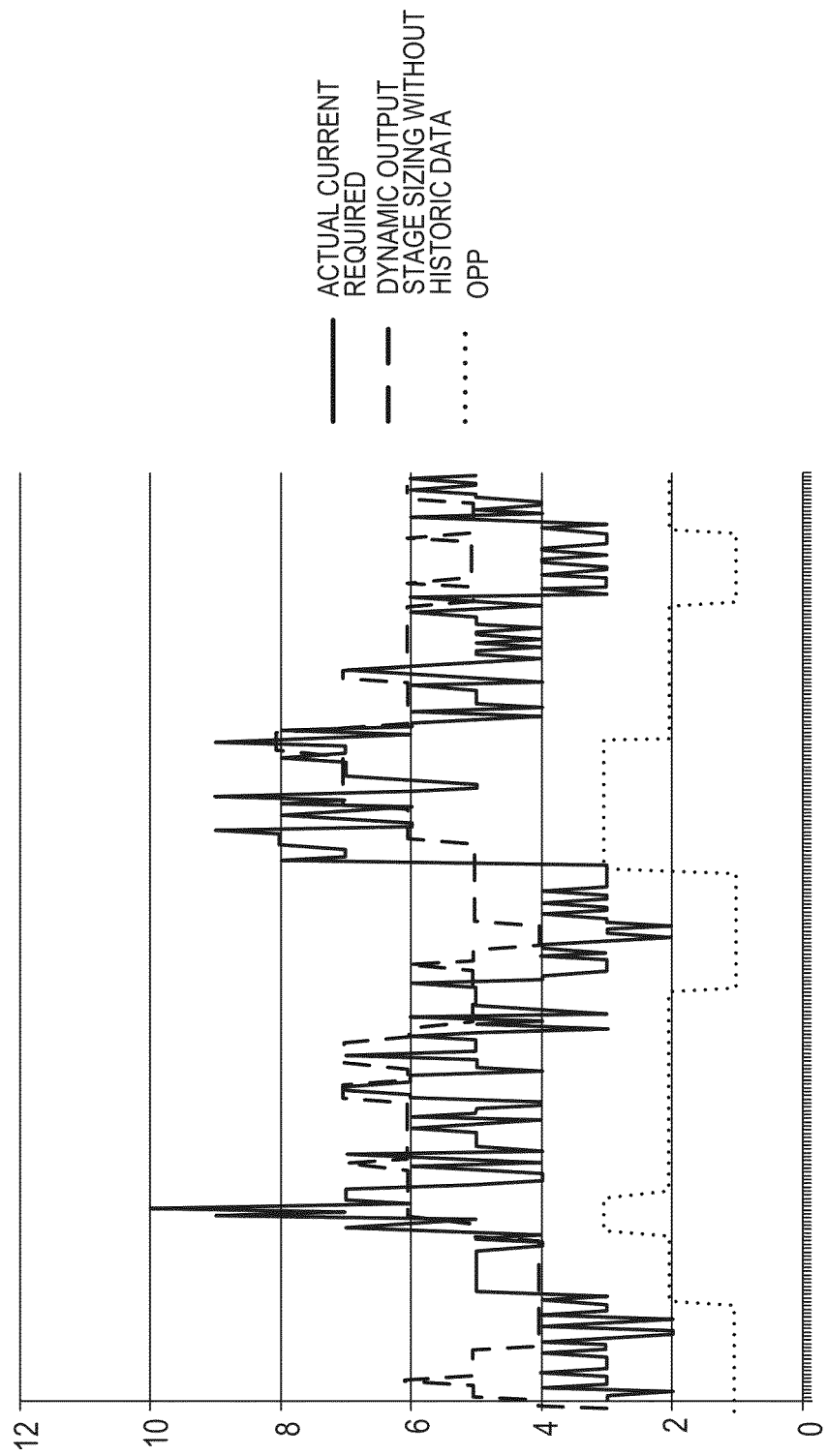
FIG. 9 is a graph of SMPS output stage optimization without historic data.

FIG. 9 depicts simulation results of current optimization performed without the use of historical data. OPP changes are indicated by a short dashed line. The actual current required by the load is depicted with a solid line. The long dashed line indicates the number W of output stages enabled, responsive to monitored current demands of the load. Such a conventional control loop clearly fails to enable sufficient output stages to adequately accommodate dynamic load current demands, particularly when the OPP changes.

Figure 10:
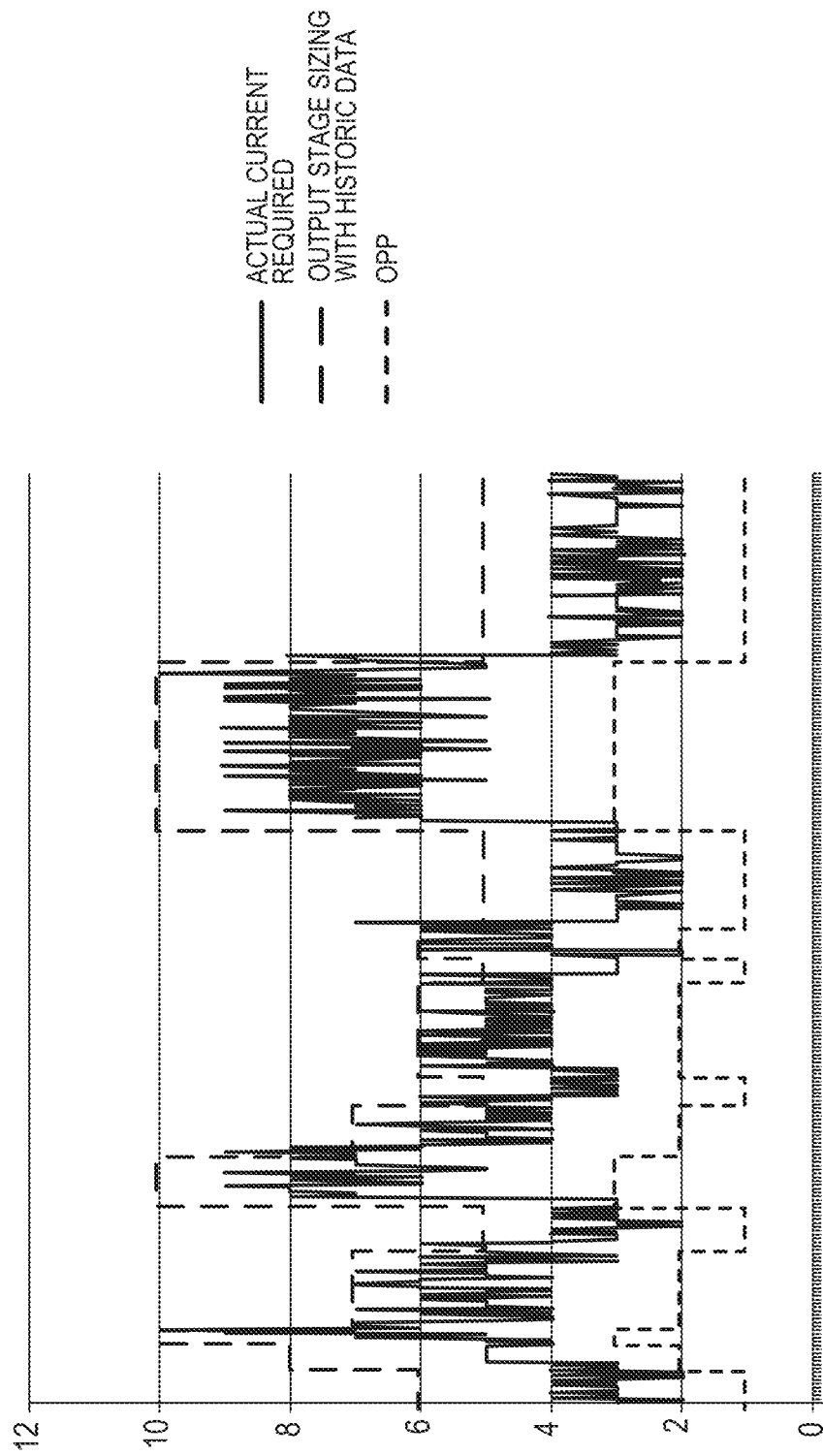
FIG. 10 is a graph of SMPS output stage optimization using historic data.

FIG. 10 depicts simulation results of the methods 100, 200 using dynamically-updated historical data for optimal W and DEV (e.g., running averages for each value over numerous iterations of each OPP). For each change in OPP, the initial number W of output stages enabled is the historically optimal number for that OPP, plus a margin that is related to the historical degree of deviation required in that OPP. The number W of stages then dynamically adjusts based on actual load current demands. The methods 100, 200 are able to consistently maintain an SMPS output stage configuration capable of supplying sufficient output current, but which approaches optimal efficiency.

In the power management unit 10 described herein, the SMPS output stages 34 are assumed to be approximately equal in terms of transistor size. The methods 100, 200 of optimizing the number W of output stages per OPP concern only the number of stages, and not the relative impact of enabling or disabling one particular stage vs. a different stage. In one embodiment, the switching transistors in the output stages may be sized differently, and hence each stage will have a different "weight" in altering the output current. For example, the output stages could be binary weighted. Such sizing of the output stages may reduce the overall number of output stages required to cover a given range of output current values, hence reducing wiring congestion, control signaling, and the like. In this case, the output stage selector circuit 36, rather than simply enabling a given number W of output stages, would encode the value W into a binary number, and enable specific output stages corresponding to the bits of the binary number.

Such a weighted output stage SMPS 30 would require no fundamental difference in the methods 100, 200 described above—the primary difference would be implementation details of the output stage selector circuit 36. Indeed, a variety of different transistor weighting schemes may be employed. Since the control algorithm works by detecting the crossing of upper and lower thresholds, the absolute contribution of any particular output stage is not accounted for in the control algorithm. Given the teachings of the present disclosure, those of skill in the art may readily modify the design in numerous ways, such as by varying the relative sizes of the SMPS output stages 34.

Embodiments of the present invention present numerous advantages over the prior art. As depicted in FIGS. 8 and 9, the methods 100, 200 provide superior stability as compared to dynamic output stage selection based on current monitoring which does not consider historic data. As FIG. 1 demonstrates, the methods 100, 200 provide greatly enhanced optimization as compared to use of a static LUT, the contents of which must account for worst-case temperature, process, aging, software versioning, and the like, plus a margin. Furthermore, production customization such as trimming, and complex calculations of digital baseband activity, are not required. Note also that the methods 100, 200 optimize SMPS output stage 34 configuration whether the load comprises a single IC, or a plurality of ICs. In the latter case, variations between ICs are automatically compensated by the adaptive algorithm of the methods 100, 200.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of selecting an output stage configuration per selected operating performance point (OPP) for a switched mode power supply having a plurality of selectable, parallel output stages, each operative to supply current to a load, the power supply operative in a system that switches between discrete OPPs, the method comprising:
   upon receiving notice that the system has switched to a first OPP, retrieving historic output stage configuration data associated with the first OPP;
   configuring the output stages according to the historic output stage configuration data;
   during operation at the first OPP, periodically monitoring a current drawn by the load;
   adjusting the output stage configuration based on the current monitoring; and
   upon receiving notice that the system has switched to a second OPP, updating the historic output stage configuration data associated with the first OPP to reflect the output stage adjustment, and storing the updated historic output stage configuration data in association with the first OPP;
   wherein the historic output stage configuration data associated with the first OPP comprises at least;

a mapping of the first OPP to a running average, over a predetermined number of iterations of the first OPP, of a determined optimal number of output stages to be enabled; and a mapping of the first OPP to a running average, over a predetermined number of iterations of the first OPP, of deviations in the number of output stages enabled.

2. The method of claim 1 wherein configuring the output stages according to the historic output stage configuration data comprises enabling a number of output stages determined by adding the running average of the determined optimal number of output stages to be enabled to a multiple of the running average of deviations in the number of output stages enabled.

3. The method of claim 1 wherein periodically monitoring a current drawn by the load comprises, at each of a plurality of monitoring periods, comparing a voltage across a switch in at least one output stage to both high and low threshold voltage values.

4. The method of claim 3 further comprising, if the switch voltage crosses either threshold over a plurality of monitoring periods, changing the number of output stages enabled so as to bring the switch voltage between the high and low threshold voltage values.

5. The method of claim 3 further comprising:
maintaining, in a match vector wherein each vector position corresponds to a number of output stages, values indicating a preference for each corresponding number of output stages being enabled;
initializing, at the beginning of an OPP, the match vector to zero for all positions except a position corresponding to the number of output stages initially enabled, and initializing that position to a positive value;
if the switch voltage exceeds the high threshold voltage over a predetermined number of consecutive monitoring periods, enabling an additional output stage and incrementing values in one or more of the match vector positions corresponding to more output stages than currently enabled;
if the switch voltage is less than the low threshold voltage value over a predetermined number of consecutive monitoring periods, disabling an output stage and incrementing values in one or more of the match vector positions corresponding to fewer output stages than currently enabled; and
if the switch voltage is between the low and high threshold voltage values over a predetermined number of consecutive monitoring periods, incrementing values in one or more of the match vector positions corresponding to the number of output stages currently enabled.

6. The method of claim 5 further comprising:
upon receiving notice that the system has switched to a second OPP, determining from the highest value in the match vector the corresponding optimal number of output stages to be enabled;
updating the running average of the determined optimal number of output stages to be enabled; and
storing the updated running average as historic output stage configuration data associated with the first OPP.

7. The method of claim 6 further comprising, if the number of output stages enabled was changed during the first OPP:
counting a net change in the number of output stages enabled during the first OPP; and
updating the running average of deviations in the number of output stages enabled to include the change; and storing the updated running average as historic output stage configuration data associated with the first OPP.

8. A power management unit operative in a system that switches between discrete operating performance points (OPP), comprising:
a switched mode power supply having a plurality of selectable, parallel output stages, each comprising two switches connected in series across a power supply, and each operative to supply current to a load when enabled;
a lookup table operative to store, for each OPP, historic output stage configuration data; and
a controller operative to
upon receiving notice that the system has switched to a first OPP, retrieve historic output stage configuration data associated with the first OPP;
configure the output stages according to the historic output stage configuration data;
during operation at the first OPP, periodically monitor the current supplied to the load;
adjust the output stage configuration so as to maintain an output stage configuration capable of supplying output current sufficient to meet the current demand of a load; and
upon receiving notice that the system has switched to a second OPP, update the historic output stage configuration data associated with the first OPP to reflect the output stage adjustment, and store the updated historic output stage configuration data in association with the first OPP;
wherein the historic output stage configuration data associated with the first OPP comprises at least
a mapping of the first OPP to a running average, over a predetermined number of iterations of the first OPP, of a determined optimal number of output stages to be enabled; and
a mapping of the first OPP to a running average, over a predetermined number of iterations of the first OPP, of deviations in the number of output stages enabled.

9. The power management unit of claim 8 wherein the controller is operative to configure the output stages according to the historic output stage configuration data by enabling a number of output stages determined by adding the running average of the determined optimal number of output stages to be enabled to a multiple of the running average of deviations in the number of output stages enabled.

10. The power management unit of claim 8 further comprising:
comparators operative to compare a voltage across a switch of an output stage to predetermined high and low voltage threshold values; and
wherein the controller is operative to monitor the current supplied to the load by monitoring the switch voltage threshold comparisons.

11. The power management unit of claim 10 wherein the controller is further operative to:
maintain, in a match vector wherein each vector position corresponds to a number of output stages, values indicating a preference for each corresponding number of output stages being enabled;
initialize, at the beginning of an OPP, the match vector to zero for all positions except a position corresponding to the number of output stages initially enabled, and initializing that position to a positive value;

if the switch voltage exceeds the high threshold voltage over a predetermined number of consecutive monitoring periods, enabling an additional output stage and incrementing values in one or more of the match vector positions corresponding to more output stages than currently enabled;

if the switch voltage is less than the low threshold voltage value over a predetermined number of consecutive monitoring periods, disabling an output stage and incrementing values in one or more of the match vector positions corresponding to fewer output stages than currently enabled; and if the switch voltage is between the low and high threshold voltage values over a predetermined number of consecutive monitoring periods, incrementing values in one or more of the match vector positions corresponding to the number of output stages currently enabled.

12. The power management unit of claim 11 wherein the controller is further operative to:

upon receiving notice that the system has switched to a second OPP, determine from the highest value in the match vector the corresponding optimal number of output stages to be enabled;

update the running average of the determined optimal number of output stages to be enabled; and store the updated running average as historic output stage configuration data associated with the first OPP.

13. The power management unit of claim 12 wherein the controller is further operative to, if the number of output stages enabled was changed during the first OPP:

count a net change in the number of output stages enabled during the first OPP; and update the running average of deviations in the number of output stages enabled to include the change; and store the updated running average as historic output stage configuration data associated with the first OPP.

14. The power management unit of claim 8 wherein the power management unit is an Integrated Circuit.

15. A portable electronic device comprising the power management unit of claim 8.

16. The portable electronic device of claim 15 wherein the portable electronic device comprises a wireless communication device.

* * * * *